United States Patent
Schwartz et al.

(10) Patent No.: US 12,201,911 B2
(45) Date of Patent: Jan. 21, 2025

(54) SYSTEMS AND METHODS FOR MAKING USE OF TELEMETRY TRACKING DEVICES TO ENABLE EVENT BASED ANALYSIS AT A LIVE GAME

(71) Applicant: Infinite Athlete, Inc., San Francisco, CA (US)

(72) Inventors: Erik Schwartz, Los Altos Hills, CA (US); Michael Naquin, Alamo, CA (US); Christopher Brown, Atlanta, GA (US); Steve Xing, San Francisco, CA (US); Pawel Czarnecki, San Francisco, CA (US); Charles D. Ebersol, Atlanta, GA (US)

(73) Assignee: Infinite Athlete, Inc., Covina, CA (US)

( * ) Notice: Subject to any disclaimer, the term of this patent is extended or adjusted under 35 U.S.C. 154(b) by 0 days.

(21) Appl. No.: 17/989,071

(22) Filed: Nov. 17, 2022

(65) Prior Publication Data

US 2023/0085122 A1 Mar. 16, 2023

Related U.S. Application Data

(63) Continuation of application No. 16/747,436, filed on Jan. 20, 2020, now Pat. No. 11,568,713.

(60) Provisional application No. 62/802,183, filed on Feb. 6, 2019, provisional application No. 62/795,012, filed on Jan. 21, 2019.

(51) Int. Cl.
*A63F 13/798* (2014.01)

(52) U.S. Cl.
CPC .................. *A63F 13/798* (2014.09)

(58) Field of Classification Search
CPC .................................................. A63F 13/798
See application file for complete search history.

(56) References Cited

U.S. PATENT DOCUMENTS

| | | | |
|---|---|---|---|
| 6,236,900 | B1 | 5/2001 | Geiger |
| 6,293,868 | B1 | 9/2001 | Bernard |
| 6,394,895 | B1 | 5/2002 | Mino |
| 9,033,781 | B2 | 5/2015 | Steir |
| 9,870,674 | B2 | 1/2018 | Hayon |
| 10,491,943 | B1 | 11/2019 | Wahlquist-Ortiz |

(Continued)

OTHER PUBLICATIONS

David et al., NFL Prediction Using Committees of Artificial Neural Networks, Journal of Quantitative Analysis in Sports, 2011, vol. 7, Issue 2.

(Continued)

*Primary Examiner* — Werner G Garner
(74) *Attorney, Agent, or Firm* — Van Pelt, Yi & James LLP

(57) ABSTRACT

In an embodiment, a process to predict a probability of a future event occurring in a present competition includes receiving time-stamped position information of one or more participants in the present competition. The time-stamped position information is captured by a telemetry tracking system during the present competition. The process uses the time-stamped position information to determine a first play situation of the present competition. The process determines, based on at least the first play situation and playing data associated with at least a subset of one or both of a first set of one or more participants and a second set of one or more participants, a prediction of the probability of a first future event occurring at the present competition.

21 Claims, 10 Drawing Sheets

(56) References Cited

U.S. PATENT DOCUMENTS

| | | | |
|---|---|---|---|
| 10,926,183 B2 | 2/2021 | Covington | |
| 2002/0087798 A1* | 7/2002 | Perincherry | G06F 16/24552 |
| | | | 707/E17.007 |
| 2008/0103997 A1 | 5/2008 | Fein | |
| 2008/0188353 A1 | 8/2008 | Vitolo | |
| 2008/0312010 A1 | 12/2008 | Marty | |
| 2009/0262137 A1 | 10/2009 | Walker | |
| 2010/0035672 A1 | 2/2010 | Root | |
| 2010/0179930 A1 | 7/2010 | Teller | |
| 2010/0298958 A1 | 11/2010 | Connelly | |
| 2011/0014974 A1 | 1/2011 | Torf | |
| 2012/0202594 A1 | 8/2012 | Bistis | |
| 2012/0214575 A1 | 8/2012 | Amaitis | |
| 2013/0095909 A1 | 4/2013 | O'Dea | |
| 2014/0018156 A1 | 1/2014 | Rizzotti | |
| 2014/0365194 A1 | 12/2014 | O'Hagan | |
| 2015/0131845 A1 | 5/2015 | Forouhar | |
| 2015/0148129 A1 | 5/2015 | Austerlade | |
| 2016/0158625 A1 | 6/2016 | Deangelis | |
| 2016/0260015 A1 | 9/2016 | Lucey | |
| 2017/0064240 A1 | 3/2017 | Mangat | |
| 2017/0165581 A1 | 6/2017 | Mcauley | |
| 2018/0095652 A1* | 4/2018 | Branch | G08B 25/008 |
| 2018/0157974 A1 | 6/2018 | Carr | |
| 2018/0190077 A1 | 7/2018 | Hall | |

OTHER PUBLICATIONS

Glickman et al., Estimating Team Strength in the NFL, Apr. 28, 2016.

Jim Warner, Predicting Margin of Victory in NFL Games: Machine Learning vs. The Las Vegas Line, Dec. 17, 2010.

Le et al., Data-Driven Ghosting using Deep Imitation Learning, Mar. 3-4, 2017, Sports Analytics Conference. (Year: 2017).

Uzoma et al., A Hybrid Prediction System for American NFL Results, International Journal of Computer Applications Technology and Research, 2015, pp. 42-47, vol. 4, Issue 1.

* cited by examiner

800

SYSTEMS AND METHODS FOR MAKING USE OF TELEMETRY TRACKING DEVICES TO ENABLE EVENT BASED ANALYSIS AT A LIVE GAME

CROSS REFERENCE TO OTHER APPLICATIONS

This application is a continuation of U.S. patent application Ser. No. 16/747,436, entitled SYSTEMS AND METHODS FOR MAKING USE OF TELEMETRY TRACKING DEVICES TO ENABLE EVENT BASED ANALYSIS AT A LIVE GAME filed Jan. 20, 2020 which is incorporated herein by reference for all purposes, which claims priority to U.S. Provisional Patent Application No. 62/795,012, entitled SYSTEMS AND METHODS FOR MAKING USE OF TELEMETRY TRACKING DEVICES AND MACHINE LEARNING TO ENABLE PLAY BY PLAY BETTING AT A LIVE GAME filed Jan. 21, 2019, and claims priority to U.S. Provisional Patent Application No. 62/802,183, entitled SYSTEMS AND METHODS FOR MAKING USE OF TELEMETRY TRACKING DEVICES AND MACHINE LEARNING TO ENABLE EVENT BASED ANALYSIS AT A LIVE GAME filed Feb. 6, 2019, both of which are incorporated herein by reference for all purposes.

BACKGROUND OF THE INVENTION

Evaluation of team strengths and players' abilities, and predicting outcomes of sport events (e.g., football games) have an important role in the sport industry for increasing spectators' interest and engagement. The evaluation is based on collection and analyses of event drive data such as play-by-play data. As an example, fantasy sports leagues and betting and/or gambling games are popular forms of applications using such historical play-by-play data in allowing spectators to get more involved with the sporting event. Conventional approaches for evaluating team strengths and thereby predicting outcomes of sport events are based on historical play-by-play data, such as data collected and published by the National Football League (NFL) at NFL.com. However, the play-by-data provided by the NFL is limited to only certain players of the teams. Also, such data is made available only after sport events are finished.

Recent developments for tracking players during a sport event can be applied to recording information about play situations (e.g., positions and movements of the players) during a game. Such tracking can be applied to track all the players of a team, instead of just a few of the key players. Additionally, the tracking provides more detailed data related to the movement and position of each player than is achievable by conventional data recording methods.

BRIEF SUMMARY

Techniques (including a system, a processor, and a computer program product) for making use of telemetry tracking devices to enable play-by-play prediction of future events and/or final outcome at a live sport event are disclosed. In various embodiments, a process predicts a probability of a future event occurring in a present competition between a first competitor that includes a first set of one or more participants and a second competitor that includes a second set of one or more participants. The process includes receiving time-stamped position information of one or more participants of one or both of the first and second sets of participant(s) in the present competition. The time-stamped position information is captured by a telemetry tracking system during the present competition (e.g., a telemetry tracking system described below with respect to FIGS. 1-7). The process uses the time-stamped position information to determine a first play situation of the present competition. The play situation can be determined at a given time point during a live sport event for example. In various embodiments, the play situation is determined using, at least in part, time-stamped position information of each of the players in the subsets of players at the given time. The play situation along with playing data is used to determine a prediction of the probability of a next event occurring at the live sport event (e.g., making a goal, a touchdown, etc.). In various embodiments, such prediction enables play-by-play betting during the live sport event, among other things.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
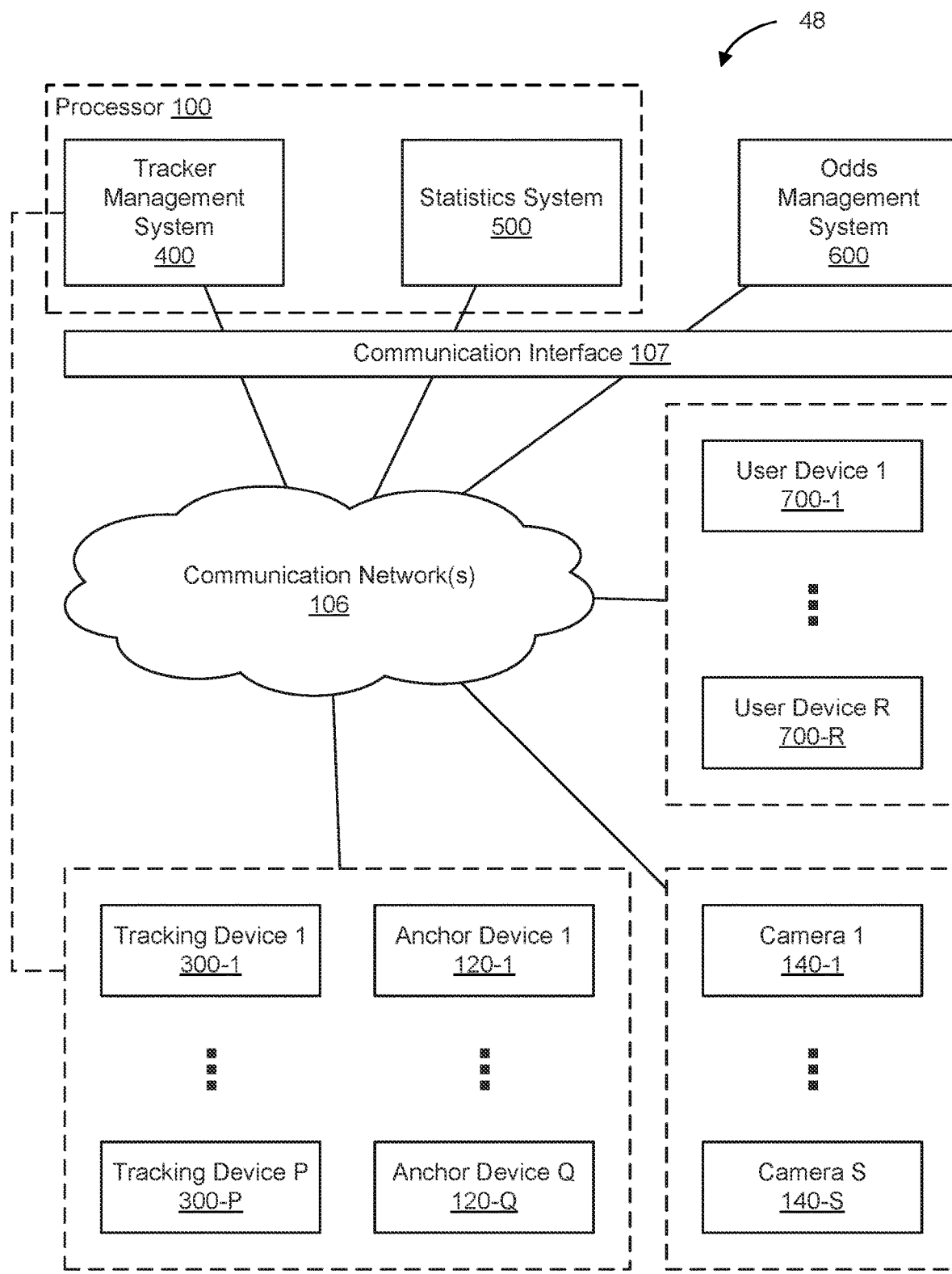
FIG. 1 is a block diagram illustrating an embodiment of a system for making use of telemetry tracking devices to enable event based analysis at a live game.

FIG. 1 is a block diagram illustrating an embodiment of a system for making use of telemetry tracking devices to enable event based analysis at a live game. This exemplary system 48 makes use of telemetry tracking devices to enable event based analysis at a live game of a competition between a first competitor and a second competitor. The first competitor includes a first set of one or more participants and a second competitor includes a second set of one or more participants. System 48 includes communication interface 107 and processor 100. Communication interface 107 is configured to receive time-stamped position information of one or more participants of one or both of the first set of participant(s) and the second set of participant(s) in the competition. In various embodiments, the time-stamped position information is captured by a telemetry tracking system during the competition. In this example, the telemetry tracking system is made up of tracking device(s) 300-1 to 300-P, anchor device(s) 120-1 to 120-Q, and optionally camera(s) 140-1 to 140-S, which are managed by tracker management system 400 as further described below.

Processor 100 is coupled to communication interface 107 and configured to calculate, e.g., while the present competition is ongoing, a first covariate parameter for each of one or more participants in one or both of the first set of participants and the second set of participants at and/or as of a point in time. Each respective first covariate parameter is derived from the time-stamped position information of a corresponding participant of the first or second set of one or more participants in the present competition at the point in time.

In various embodiments, processor 100 includes tracking management system 400 for tracking a plurality of subjects and statistics system 500 for managing various statistics. Tracking device management system 400 facilitates managing of one or more tracking devices 300 and one or more anchor devices 120 of the system. Statistics system 500 stores and/or generates various statistics for use in predicting an outcome at a competition such as a live sports event, providing odds for wagering on various circumstances or outcomes in the sports event, and other similar activities. In various embodiments, tracking management system 400 and statistics system 500 comprise software engines or modules running on processor 100 and/or separate or potentially separate systems, each comprising and/or running on one or more processors comprising processor 100.

In various embodiments, system 48 includes odds management system 600 for managing odds and a plurality of user devices 700-1 to 700-R. Although odds management system 600 is shown external to processor 100, in some embodiments the odds management system is included in the processor. Odds management system 600 facilitates determining odds for outcomes in a sports event and managing various models related to predicting outcomes at the live event.

In some embodiments, the system includes one or more user devices 700 that facilitate end user interaction with various systems of the present disclosure, such as odds management system 600. Moreover, in some embodiments, system 48 includes one or more cameras 140 that capture live images and/or video of a live event that is then utilized by the systems of the present disclosure. In some embodiments, the cameras 140 include one or more high resolution cameras. By way of non-limiting example, the one or more high resolution cameras includes a camera with a 1080p resolution, 1440p resolution, 2K resolution, 4K resolution, or 8K resolution. Utilizing a camera 140 with a high resolution allows for a video feed captured by the camera to be partitioned at a higher resolution, while also allowing for more partitions to be created without a noticeable decline in image quality.

The above-identified components are interconnected, optionally through a communications network. Elements in dashed boxes are optional combined as a single system or device. Of course, other topologies of the computer system 48 are possible. For instance, in some implementations, any of the illustrated devices and systems can in fact constitute several computer systems that are linked together in a network, or be a virtual machine or a container in a cloud computing environment. Moreover, in some embodiments rather than relying on a physical communications network 106, the illustrated devices and systems wirelessly transmit information between each other. As such, the exemplary topology shown in FIG. 1 merely serves to describe the features of an embodiment of the present disclosure in a manner that will be readily understood to one of skill in the art.

In some implementations, the communication network 106 interconnects tracking device management system 400 that manages one or more tracking devices 300 and one or more anchors 120, statistics system 500, odds management system 600, one or more user devices 700, and one or more cameras 140 with each other, as well as optional external systems and devices. In some implementations, the communication network 106 optionally includes the Internet, one or more local area networks (LANs), one or more wide area networks (WANs), other types of networks, or a combination of such networks.

Examples of networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In various embodiments, processor 100 includes a machine learning engine 210 (not shown in FIG. 1) that facilitates the prediction of the outcome of a competitions. The next figure describes an example of processor 100 that includes a machine learning engine in greater detail.

Figure 2A:
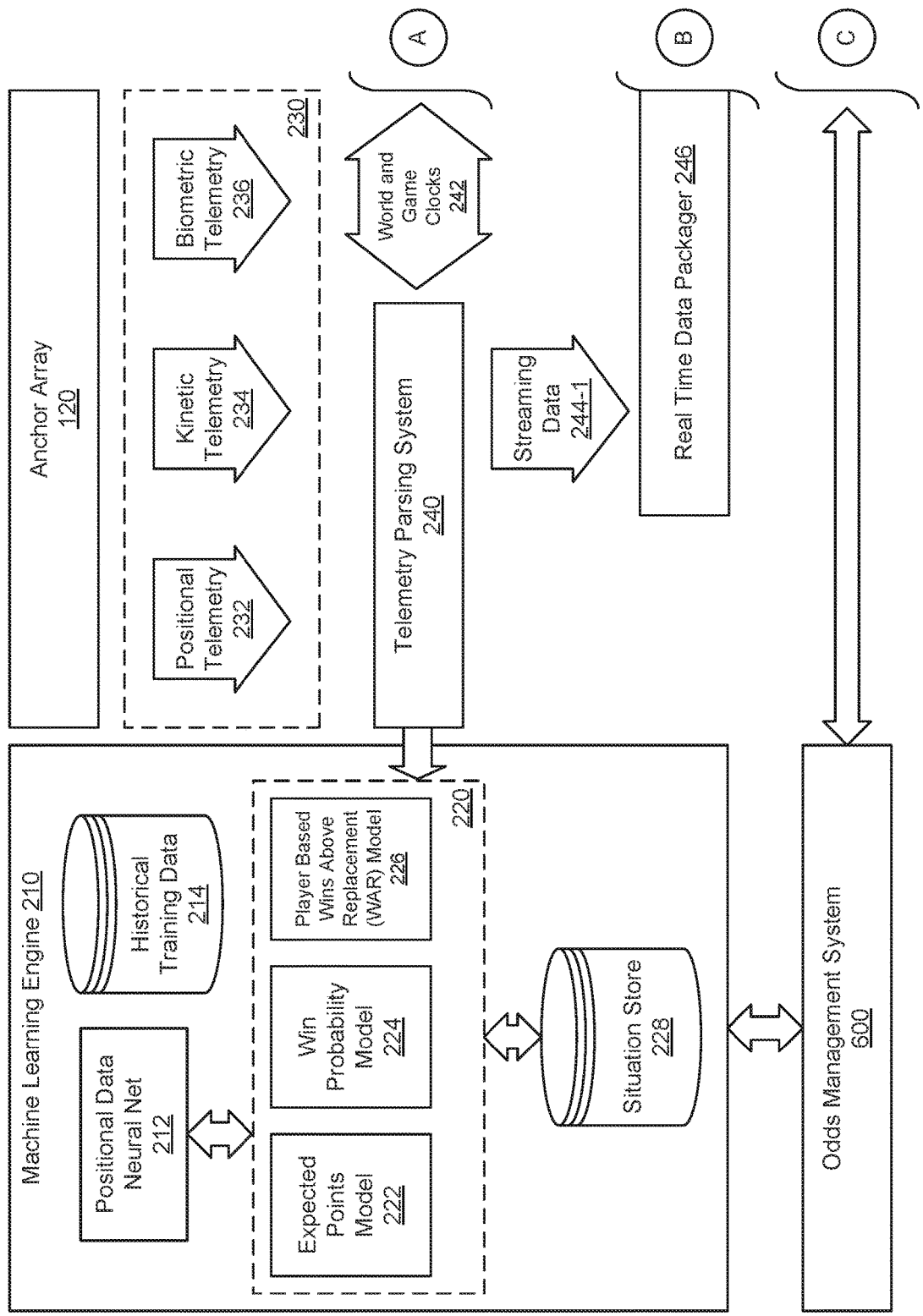
FIG. 2A shows a block diagram illustrating an embodiment of a system for making use of telemetry tracking devices to enable event based analysis at a live game.
Figure 2B:
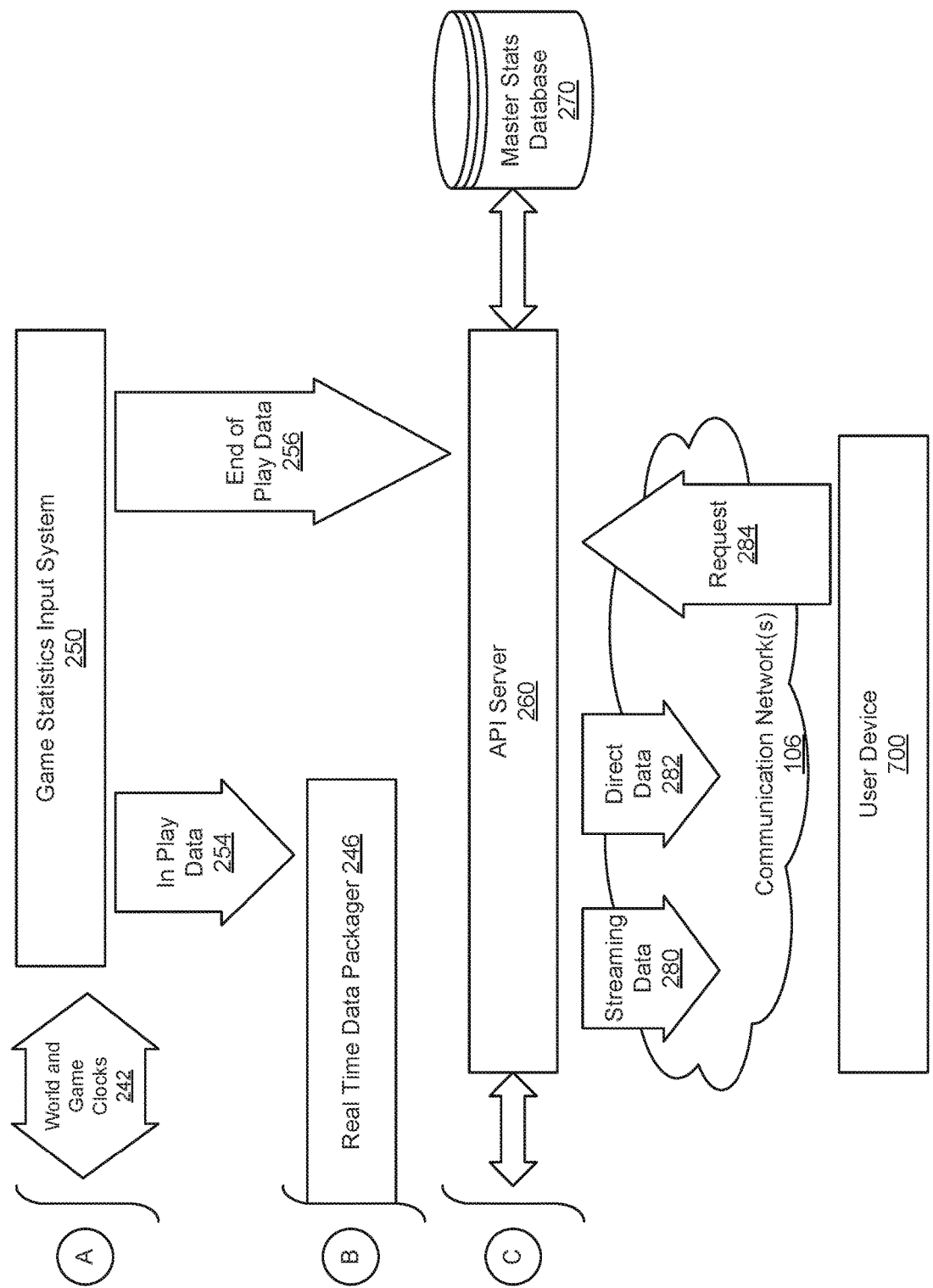
FIG. 2B shows a block diagram illustrating an embodiment of a system for making use of telemetry tracking devices to enable event based analysis at a live game.

FIGS. 2A and 2B show a block diagram illustrating an embodiment of a system for making use of telemetry tracking devices to enable event based analysis at a live game. As depicted in FIG. 2A, an array of anchor devices 120 receives telemetry data 230 from one or more tracking devices 300. In order to minimize error in receiving the telemetry from the one or more tracking devices 300, the array of anchor devices 120 preferably includes at least three anchor devices. Inclusion of at least three anchor devices 120 within the array of anchor devices allow for each ping (e.g., telemetry data 230) received from a respective tracking device 300 to be triangulated using the combined data from the at least three anchor that receive the respective ping. Additional details and information regarding systems and methods for receiving pings from tracking devices and the optimization thereof will be described in more detail infra, with particular reference to at least FIGS. 3 and 4.

In the example shown, the telemetry data 230 that is received by the array of anchors 120 from the one or more tracking devices 300 includes positional telemetry data 232. The positional telemetry data 232 provides location data for a respective tracking device 300, which describes a location of the tracking device within a spatial region. In some embodiments, this positional telemetry data 232 is provided as one or more Cartesian coordinates (e.g., an X coordinate, a Y coordinate, and/or Z a coordinate) that describe the position of each respective tracking device 300, although any coordinate system (e.g., polar coordinates, etc.) that describes the position of each respective tracking device 300 is used in alternative embodiments.

The telemetry data 230 that is received by the array of anchors 120 from the one or more tracking devices 300 includes kinetic telemetry data 234. The kinetic telemetry data 234 provides data related to various kinematics of the respective tracking device. In some embodiments, this kinetic telemetry data 234 is provided as a velocity of the respective tracking device 300, an acceleration of the respective tracking device, and/or a jerk of the respective tracking device. Further, in some embodiments one or more of the above values is determined from an accelerometer (e.g., accelerometer 317 of FIG. 3) of the respective tracking device 300 and/or derived from the positional telemetry data 232 of the respective tracking device. Further, in some embodiments the telemetry data 230 that is received by the array of anchors 120 from the one or more tracking devices 300 includes biometric telemetry data 236. The biometric telemetry data 236 provides biometric information related to each subject associated with the respective tracking device 300. In some embodiments, this biometric information includes a heart rate of the subject, temperature (e.g., a skin temperature, a temporal temperature, etc.), and the like.

In some embodiments, the array of anchors 120 communicates the above described telemetry data (e.g., positional telemetry 232, kinetic telemetry 234, biometric telemetry 236) to a telemetry parsing system 240. Accordingly, in some embodiments the telemetry parsing system 240 communicates the telemetry data (e.g., stream of data 244) to a machine learning engine 210 and/or a real time data packager 246 for further processing and analysis.

In some embodiments, the real time data packager 246 synchronizes one or more data sources (e.g., streaming data 244 from telemetry parsing system 240, game statistics input system 250, machine learning engine 210, etc.) by using one or more timestamps associated with the respective data. For instance, in some embodiments the data sources provide data that is associated with a real world clock timestamp (e.g., an event occurred at and is associated with a real world time of 1:17 P.M.). In some embodiments, the data sources provide data that is associated with a game clock timestamp related to a live sports event (e.g., an event occurred with 2 minutes and 15 seconds remaining in the second quarter). Moreover, in some embodiments the data sources provide data that is associated with both the real world clock timestamp and the game clock timestamp. Synchronization of the data sources via timestamps allows for a designer of the present disclosure to provide services with an additional layer of accuracy, particularly with betting and wagering on outcomes at a live event. For instance, in some embodiments data provided to a user device 700 (e.g., streaming data 280 and/or direct data 282 of FIG. 2B) describes the wagering (e.g., odds) on a next play in a football game. In order to determine if an end user of the user device 700 places a wager within a predetermined window of time (e.g., before the snap of the ball of the next play), the game clock and real world time data received from the user device and/or communicated to the user device are analyzed and the wager is either validated, rejected, or held for further consideration.

In some embodiments, machine learning engine 210 receives data from various sources of the present disclosure in order to predict a future outcome at a live sporting event and generate statistics for analysis and use. For instance, in some embodiments the data sources of the machine learning engine 210 includes a positional data formation classifier 212, hereinafter "neural net," that provides information related to various configurations and formations of players at any given point of time in game. For instance, in some embodiments the formation classifier 212 parses the telemetry data 230 to analyze pre-snap formations of players. The analyses of the pre-snap telemetry data 230 allows for the formation classifier 212 to determine various states and conditions of the game, such as a down of a game, a positional rule violation within a game (e.g., off-sides, illegal motion, etc.), and the like. Moreover, in some embodiments the formation classifier 212 analyzes telemetry data 230 that is received subsequent the start of the play in order to further generate data and information related to how each formation evolves (e.g., an expected running route versus an actual running route, an expected blocking assignment versus an action blocking assignment, a speed of a player throughout a play, a distance between two players throughout a play, etc.).

In some embodiments, machine learning engine 210 includes a historical training data store 214. Historical data store 214 provides historical data and information related to each particular sport (e.g., sports historical data 508 of FIG. 5), each particular team associated with the particular sport (e.g., team historical data 510 of FIG. 5), and/or each particular player associated with the particular sport and/or team (e.g., player historical data 514 of FIG. 5). In some embodiments, this data is initially used as a training data set for the machine learning engine 210. However, the present disclosure is not limited thereto as this data may also be used to further augment the features and services provided by the machine learning engine 210 and other systems of the present disclosure.

Further, in some embodiments the machine learning engine 210 includes a variety of models 220 that are utilized to predict a future outcome of a sporting event and provide analysis of the sporting event. In some embodiments, the models 220 of the machine learning engine 210 include an expected points model 222. The expected points model 222 provides a likelihood of receiving points for a particular play at the event via a numerical value. In some embodiments, the models 220 of the machine learning engine 210 include a win probability model 224 that provides either a likelihood of each participating team of the event to win or a likelihood of any given point spread between the winning and losing teams at the event. Furthermore, in some embodiments the models 220 of the machine learning engine 210 include a player based wins above replacement (WAR) model 226. The WAR model 226 provides a contribution value a respective player adds to their corresponding team (e.g., player 1 provides a value of 1 to a respective team and player two provides a value of 2 to the respective team, therefore player two is worth more to the respective team).

In some embodiments, machine learning engine 210 include a situation store 228. The situation store 228 is a cache of various situational details and/or statistics that is accessed rapidly during a real game scenario. Rapid access to the situation store 228 prevents lag that would otherwise be induced from querying different databases and systems (e.g., positional data formation classifier 212, historical training data 214, etc.) in order to obtain the same information. Additional details and information regarding the machine learning engine and the components therein, including the various above described data stores and models, will be described in more detail infra, with particular reference to at least FIGS. 5 and 6.

Machine learning engine 210 communicates various odds and outputs of the various databases and models therein to an odds management system 600. In communicating with the machine learning engine 210, the odds management system 600 provides various wagers and predictive odds for future events at a sporting event to the user devices 700, while also updating these odds in real time to reflect current situations and statistics of a game.

As depicted in FIG. 2B, in some embodiments system 48 includes a game statistics input system 250. The game statistics input system 250 is configured for providing at least in play data 254, which, in example case of football, describes a state of the game during a given play (e.g., a weak side receiver ran a post route), as well as end of play data 256, which describes a state of the game after a given play (e.g., a play resulted in a first down at the opponents 42-yard line). In some embodiments, the data of the statistics input system 250 is associated with the world and game clock 242, and accordingly is communicated to the telemetry parsing system 240 and/or the machine learning engine 210. In some embodiments the game statistics input system 250 is subsumed by the formation classifier 212.

In some embodiments, various data is communicated to an application programing interface (API) server 260. This data may include streaming data 244, end of play data 256, data from the odds management system 600, or a combination thereof. Accordingly, the API server 260 facilitates communication between various components of the system 48, one or more user devices 700, and a master statistics database 270 in order to provide various features and services of the present disclosure (e.g., a stream of the game, a request for statistics, placing a wager on a play, etc.). Communication between the API server 260 and the one or more user devices 700 includes providing streaming data 280 and/or direct data 282 to each respective user device 700 through the communications network 106, as well as receiving various requests 284 from each respective user device. By way of non-limiting example, streaming data 280 includes tracking "telemetry" data including xyz coordinates of players or accelerometer data of players, direct data 282 includes clock, score, or remaining timeouts.

In some embodiments, the master statistics database 270 includes some or all of the statistics known to the machine learning engine 210 that are obtainable to a user. The master statistics database is updated regularly such as at the end of every play or every few plays. For instance, in some embodiments only a portion of the statistics known to the machine learning engine 210 is desired to be obtainable by a user, and thus is stored in the master statistics database 270. However, the present disclosure is not limited thereto. For instance, in some embodiments the master statistics database 270 is subsumed by the machine learning engine 270. Elements in dashed boxes are optional combined as a single system or device.

Now that an infrastructure of the system 48 has been generally described, an exemplary tracking device 300 will be described with reference to FIG. 3.

Figure 3:
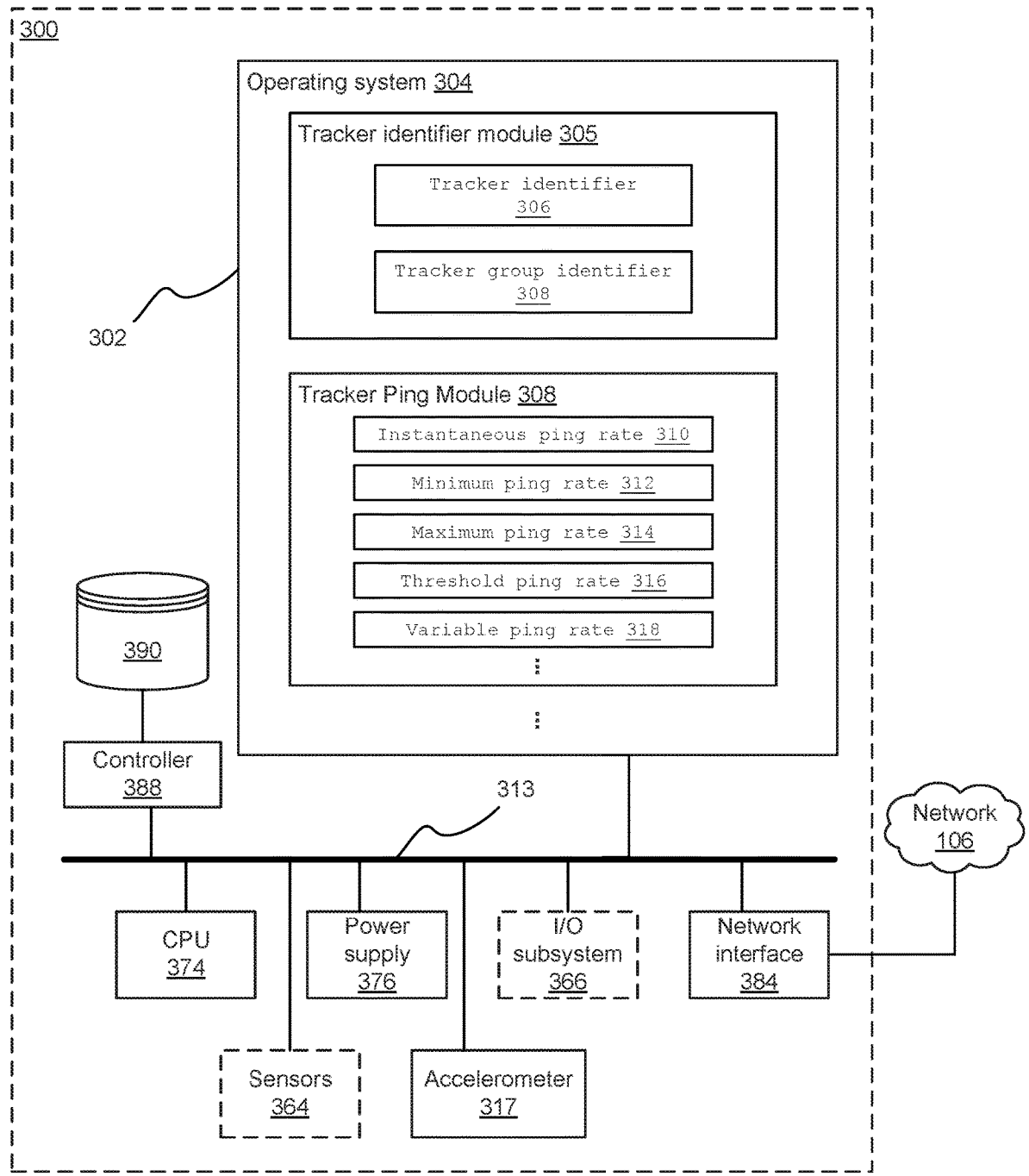
FIG. 3 is a block diagram illustrating an embodiment of a tracking device.

FIG. 3 is a block diagram illustrating an embodiment of a tracking device. In various implementations, the tracking device, hereinafter also a "tracker," includes one or more processing units (CPUs) 374, a memory 302 (e.g., a random access memory), one or more magnetic disk storage and/or persistent device 390 optionally accessed by one or more controllers 388, a network or other communications interface (which may include RF circuitry) 384, an accelerometer 317, one or more optional intensity sensors 364, an optional input/output (I/O) subsystem 366, one or more communication busses 313 for interconnecting the aforementioned components, and a power supply 376 for powering the aforementioned components. In some implementations, data in memory 302 is seamlessly shared with non-volatile memory 390 using known computing techniques such as caching. In some implementations, memory 302 and/or memory 390 may in fact be hosted on computers that are external to the tracking device 300 but that can be electronically accessed by the tracking device 300 over an Internet, intranet, or other form of network or electronic cable (illustrated as element 106 in FIG. 1) using network interface 384.

In various embodiments, the tracking device 300 illustrated in FIG. 3 includes, in addition to accelerometer(s) 317, a magnetometer and/or a GPS (or GLONASS or other global navigation system) receiver for obtaining information concerning a location and/or an orientation (e.g., portrait or landscape) of the tracking device 300.

It should be appreciated that the tracking device 300 illustrated in FIG. 3 is only one example of a device that may be used for obtaining telemetry data (e.g., positional telemetry 232, kinetic telemetry 234, and biometric telemetry 236) of a corresponding subject, and that the tracking device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 302 of the tracking device 300 illustrated in FIG. 3 optionally includes high-speed random access memory and optionally also includes non-volatile memory, such as one or more magnetic disk storage devices, flash memory devices, or other non-volatile solid-state memory devices. Access to memory 302 by other components of the tracking device 300, such as CPU(s) 374 is, optionally, controlled by the memory controller 388.

In some embodiments, the CPU(s) 374 and memory controller 388 are, optionally, implemented on a single chip. In some other embodiments, the CPU(s) 374 and memory controller 388 are implemented on separate chips.

Radio frequency (RF) circuitry of network interface 384 receives and sends RF signals, also called electromagnetic signals. In some embodiments, the RF circuitry 384 converts electrical signals to from electromagnetic signals and communicates with communication networks and other communications devices, such as the one or more anchor devices 120 and/or the tracking device management system 400, via the electromagnetic signals. The RF circuitry 384 optionally includes well-known circuitry for performing these functions, including but not limited to an antenna system, a RF transceiver, one or more amplifiers, a tuner, one or more oscillators, a digital signal processor, a CODEC chipset, a subscriber identity module (SIM) card, memory, and so forth. On some embodiments, the RF circuitry 384 optionally communicates with the communication network 106.

In some embodiments, the network interface (including RF circuitry) 384 operates via ultra-wide band (UWB) technology, which allows for the tracking device 300 to communicate with an array of anchor devices 120 in a crowded spatial region, such as a live sporting event. In some embodiments, the tracking device 300 transmits a low power (e.g., approximately 1 milliwatt (mW)) signal at a predetermined center frequency (e.g., 6.55 GHz±200 mHz, yielding a total frequency range of transmission of approximately about 6.35 GHz to about 6.75 GHZ). As used herein, these communications and transmissions are hereinafter referred to as a "ping." For a discussion of UWB, see Jiang et al, 2000, "Ultra-Wide Band technology applications in construction: a review," Organization, Technology and Management in Construction 2 (2), 207-213.

In some embodiments, the power supply 358 optionally includes a power management system, one or more power sources (e.g., a battery, a recharging system, a power failure detection circuit, a power converter or inverter, a power status indicator (e.g., a light-emitting diode (LED)) and any other components associated with the generation, management and distribution of power in such tracking devices 300. In some embodiments, the telemetry data 230 includes information related to the power supply 358 of the respective tracking device 300, such as a battery consumption or an expected period of time until the tracking device requires more power.

In some implementations, the memory 302 of the tracking device 300 for tracking a respective subject stores:

an operating system 304 (e.g., ANDROID, IOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a tracking device identifier module 305 that stores data used to identify the respective tracking device 300 including a tracking device identifier 306 and an optional tracking device group identifier 307; and a tracking device ping module 308 that stores data and information related to a ping rate of the respective tracking device, the tracking device ping module 308 including:

an instantaneous ping rate 310 that describes a current ping rate a respective tracking device 300 is currently operating at, a minimum ping rate 312 that describes a minimum ping rate a respective tracking device 300 may operate at, a maximum ping rate 314 that describes a maximum ping rate a respective tracking device 300 may operate at, a threshold ping rate 316 that describes a minimum ping rate a respective tracking device 300 may operate at, and a variable ping rate flag 318.

The tracking device identifier module 305 stores information that relates to identifying the respective tracking device 300 from a plurality of tracking devices (e.g., tracking device 1 300-1, tracking device 2 300-3, . . . , tracking device P 300-P). In some embodiments, the information stored by the tracking device identifier module 305 includes a tracking device identifier (ID) 306 that includes a unique ID (e.g., a serial number or a code) representing the respective tracking device 300. In some embodiments, the tracking device ID module 305 includes a tracking device group ID 307 that designates the respective tracking device 300 to one or more groups of tracking devices (e.g., tracking device group 418-2 of FIG. 4). Further, in some embodiments pings communicated by the respective tracking device 300 includes data of the tracking device ID module 305, allowing for an array of anchor devices 120 to identify pings received from more than one tracking device. Additional details and information regarding the grouping of a tracking device 300 will be describe in more detail infra, with particular reference to at least FIG. 4.

The tracking device ping module 308 stores data and information related to various ping parameters and conditions of respective tracking device 300, as well as facilitating management of the ping. For instance, in some embodiments the tracking device ping module 308 manages an instantaneous ping rate 310 of the respective tracking device 300 (e.g., managing an instantaneous ping rate 310 to be 10 Hertz (HZ)). In some embodiments, the tracking device 300 is configured with one or more ping rate limits, including one or more both of a minimum ping rate 312 and a maximum ping rate 314, that define a maximum and a minimum ping rate that the tracking device 300 may transmit pings. For instance, in some embodiments the minimum ping rate 312 and/or the maximum ping rate 314 may be set by the tracking device management system 400 based upon one or more of bandwidth limitations, a number of active tracking devices 300, and a type of expected activity (e.g., a sport and/or event types, an expected subject activity, etc.). When configured with one or both ping rate limits, the tracking device ping module 308 operates to adjust the instantaneous ping rate 310 between the minimum ping rate 312 and the maximum ping rate 314. Thus, automatic optimization of tracking management system 400 may be used in combination with automatic ping rate adjustment of tracking device 300. In some embodiments, tracking device ping module 308 is configured to compare detected motion from accelerometer 317 to a predefined threshold 316. Accordingly, the ping module 308 increases the instantaneous ping rate 310 in accordance with a determination that the detected motion is greater than predefined threshold 316 (e.g., until the instantaneous ping rate 310 reaches the maximum ping rate 314). Likewise, the ping module 308 decreases the instantaneous ping rate 310 (e.g., until the instantaneous ping rate 310 reaches the minimum ping rate 312) in accordance with a determination that the detected motion is less than the threshold ping rate 316.

In some embodiments, the ping module 310 includes a variable ping rate flag 318, which is configured (e.g., set wirelessly) by the tracking device management system 400, that determines whether ping module 308 automatically, or not, changes the instantons ping rate 310 based upon determined activity. For example, the tracking device management system 400 may set variable ping rate flag 318 to "false" for one or more tracking devices 300 that is associated with a player not currently participating on the field of play, wherein instantaneous ping rate 310 remains at a low rate even if the player is actively warming up for example. Tracking device management system 400 sets variable ping rate flag 318 to "true" for one or more players that is actively participating on the field of play. Furthermore, in some embodiments each tracking device 300 is dynamically configured based upon a location of the respective tracking device. For instance, in accordance with a determination that a tracking device 300 is within a field of play (e.g., if a player is actively participating in a game) as opposed to a determination that the tracking device is off the field of play (e.g., if a player is not actively participating in a game).

Utilizing the tracking device ping model 308 and/or the sensor (e.g., accelerometer 317 and/or optional sensors 364) within tracking device 300 increases reliability of the system 48 (e.g., the array of anchors 120, the telemetry parsing system 240, the tracking device management system 400, etc.) to track subjects disposed with the tracking device.

As previously described, in some embodiments each tracking device 300 provides telemetry data 230 that is received and communicated by various anchors 120 that are proximate to the respective tracking device 300. This telemetry data includes positional telemetry data 232 (e.g., X, Y, and/or Z coordinates), kinetic telemetry data 234 (e.g., velocity, acceleration, and/or jerk), and/or biometric telemetry data 236 (e.g., heart rate, physical attributes of a player such as shoulder width, etc.).

In some embodiments, each subject in the game is equipped with more than one tracking device 300 in order to increase the accuracy of the data received from the tracking devices about the subject. For instance, in some embodiments the left shoulder and the right shoulder of a respective subject are both equipped with a tracking device 300, each such tracking device functioning normally and having line of site to at least a subset of the anchors 120. Accordingly, in some embodiments the data from the left and right tracking devices 300 have their telemetry data 230 combined to form a single time-stamped object. This single object combines positional data from both tracking devices 300 to create a center line representation of a position of the respective player. Moreover, this center line calculated position provides a more accurate representation of the center of a player's position on the playing field. Further, using the relative positional data from two tracking devices 300 positioned on the left and right shoulders of a player, prior to creating the single player object as described above, allows the system 48 to determine a direction (e.g., a rotation) that the player is facing. In various embodiments, including rotational data greatly eases the task of creating avatars from data created by recording telemetry data 230 during a game and/or establishing sophisticated covariates that can be used to better predict future events in the game or the final outcome of the game itself.

In some embodiments, the tracking device 300 has any or all of the circuitry, hardware components, and software components found in the device depicted in FIG. 3. In the interest of brevity and clarity, only a few of the possible components of the tracking device 300 are shown to better emphasize the additional software modules that are installed on the tracking device 300.

Figure 4:
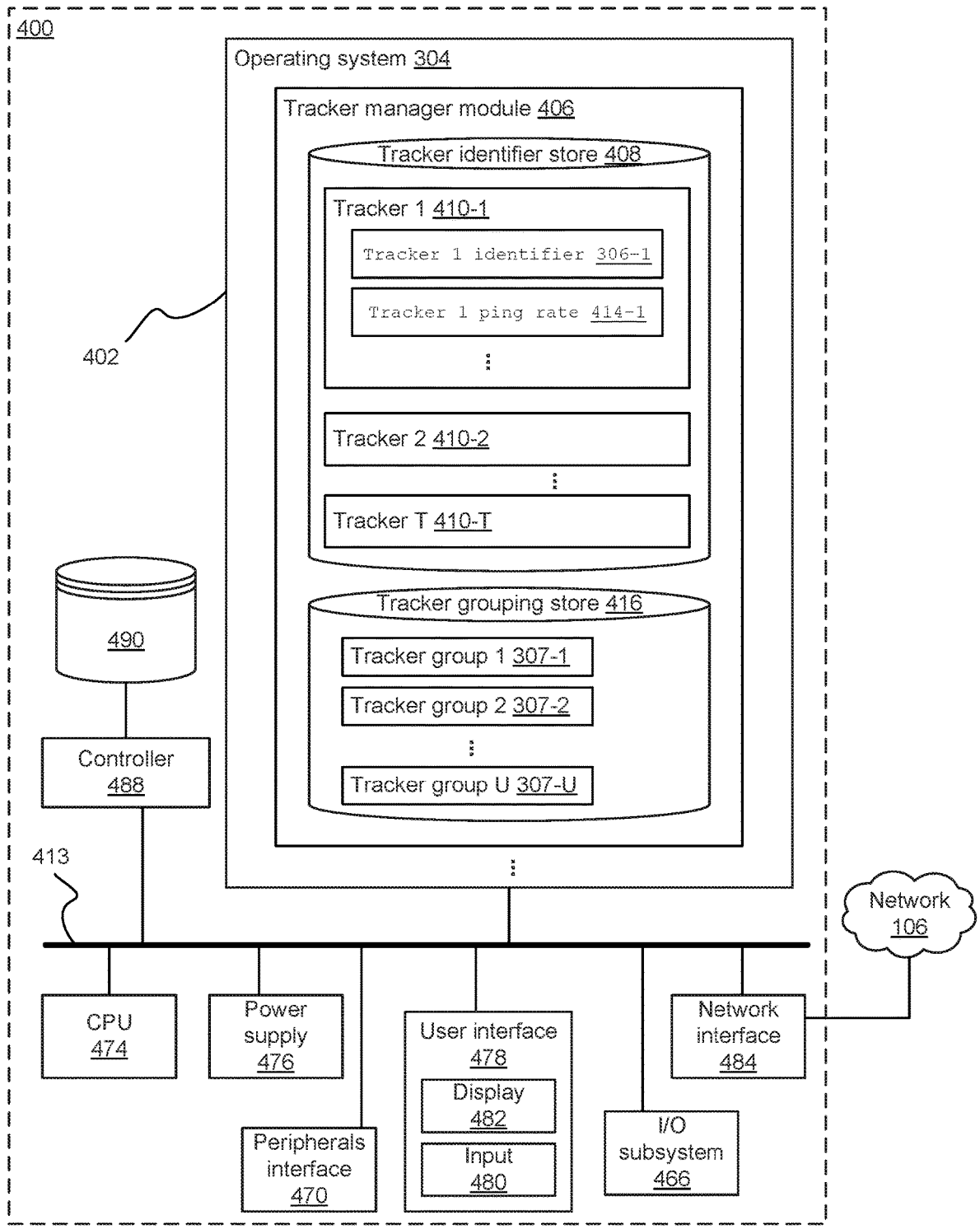
FIG. 4 is a block diagram illustrating an embodiment of a tracking device management system.

FIG. 4 is a block diagram illustrating an embodiment of a tracking device management system. Tracking device management system 400 is associated with one or more tracking devices 300 and anchors 120. The tracking device management system 400 includes one or more processing units (CPUs) 474, a peripherals interface 470, a memory controller 488, a network or other communications interface 484, a memory 402 (e.g., random access memory), a user interface 478, the user interface 478 including a display 482 and an input 480 (e.g., a key, board, a keypad, a touch screen, etc.), an input/output (I/O) subsystem 466, one or more communication busses 413 for interconnecting the aforementioned components, and a power supply system 476 for powering the aforementioned components.

In some embodiments, the input 480 is a touch-sensitive display, such as a touch-sensitive surface. In some embodiments, the user interface 478 includes one or more soft key, board embodiments. The soft key, board embodiments may include standard (QWERTY) and/or non-standard configurations of symbols on the displayed icons.

It should be appreciated that tracking device management system 400 is only one example of a system that may be used in engaging with various tracking devices 300, and that tracking device management system 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more magnetic disk storage devices, flash memory devices, or other non-volatile solid-state memory devices. Access to memory 402 by other components of the management system 400, such as CPU(s) 474 is, optionally, controlled by memory controller 488.

Peripherals interface 470 can be used to couple input and output peripherals of the management system to CPU(s) 474 and memory 402. The one or more processors 474 run or execute various software programs and/or sets of instructions stored in memory 402 to perform various functions for the management system 400 and to process data.

In some embodiments, peripherals interface 470, CPU(s) 474, and memory controller 488 are, optionally, implemented on a single chip. In some other embodiments, they are, optionally, implemented on separate chips.

In some embodiments, power system 476 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 4, memory 402 of the tracking device management system preferably stores:

an operating system 404 (e.g., ANDROID, IOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components; and a tracking device manager module 406 for facilitating management of one or more tracking devices 300, the tracking device manager module including:

a tracking device identifier store 408 for storing pertinent information related to each respective tracking device 410-1 including a tracking device identifier 306 and a tracking device ping rate 414, and a tracking device grouping store 416 for facilitating management of or more tracking device groups 307.

The tracking device identifier store 408 includes information related to each respective tracking device 410-1, including the tracking device identifier (ID) 306 for each respective tracking device 300 as well as a tracking device group 307 to which the respective tracking device is associated. For instance, in some embodiments a first tracking device group 307-1 is associated with the left shoulder of each respective subject and a second tracking device group 307-2 is associated with a right shoulder of each respective subject. Moreover, in some embodiments a third tracking device group 307-3 is associated with a first position (e.g., receiver, defensive end, safety, etc.) of each respective subject and a fourth tracking device group 307-4 is associated with a second position. Grouping 307 of the tracking devices 300 allows for a particular group to be designated with a particular ping rate (e.g., a faster ping rate for running backs). Grouping 307 of the tracking devices 300 also allows for a particular group to be isolated from other tracking devices that are not associated with the respective group, which is useful in viewing representations of the telemetry data 230 provided by the tracking devices of the group. Additional information related to tracking devices and tracking device management systems is found in U.S. Pat. No. 9,950,238, entitled "Object Tracking System Optimization and Tools."

Figure 5:
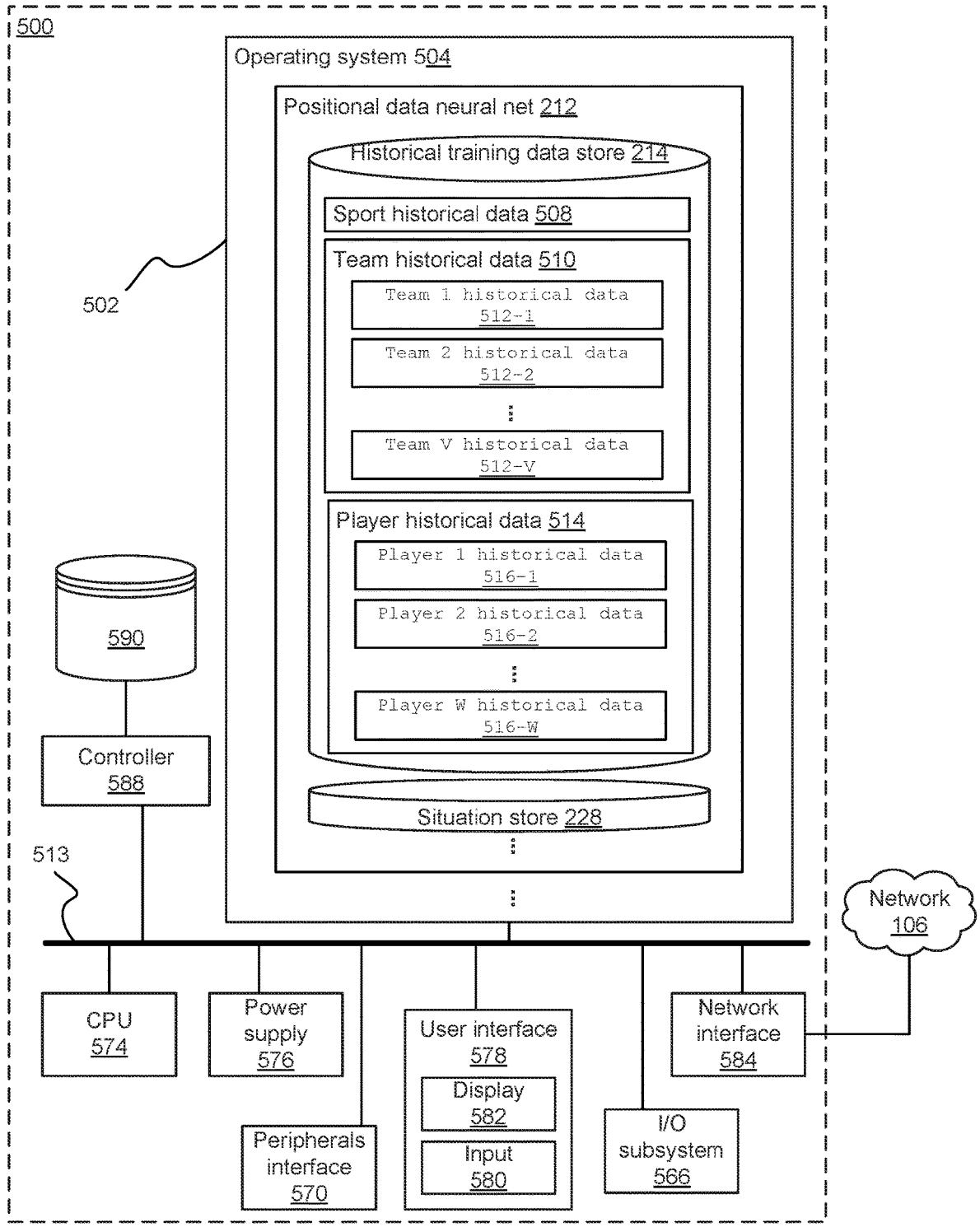
FIG. 5 is a block diagram illustrating an embodiment of a statistics system.

FIG. 5 is a block diagram illustrating an embodiment of a statistics system. Statistics system 500 stores and determines various statistics in accordance with the present disclosure. The statistics system 500 includes one or more processing units (CPUs) 574, peripherals interface 570, memory controller 588, a network or other communications interface 584, a memory 502 (e.g., random access memory), a user interface 578, the user interface 578 including a display 582 and an input 580 (e.g., a key, board, a keypad, a touch screen, etc.), input/output (I/O) subsystem 566, one or more communication busses 513 for interconnecting the aforementioned components, and a power supply system 576 for powering the aforementioned components.

In some embodiments, the input 580 is a touch-sensitive display, such as a touch-sensitive surface. In some embodiments, the user interface 578 includes one or more soft key, board embodiments. The soft key, board embodiments may include standard (e.g., QWERTY) and/or non-standard configurations of symbols on the displayed icons.

It should be appreciated that statistics system 500 is only one example of a system that may be used in staring and determining various statistics, and that statistics system 500 optionally has more or fewer components than shown, optionally combines two or more components, or optionally has a different configuration or arrangement of the components. The various components shown in FIG. 5 are implemented in hardware, software, firmware, or a combination thereof, including one or more signal processing and/or application specific integrated circuits.

Memory 502 optionally includes high-speed random access memory and optionally also includes non-volatile memory, such as one or more magnetic disk storage devices, flash memory devices, or other non-volatile solid-state memory devices. Access to memory 502 by other components of the statistics system 500, such as CPU(s) 574 is, optionally, controlled by memory controller 588.

Peripherals interface 570 can be used to couple input and output peripherals of the management system to CPU(s) 574 and memory 502. The one or more processors 574 run or execute various software programs and/or sets of instructions stored in memory 502 to perform various functions for the statistics system 500 and to process data.

In some embodiments, peripherals interface 570, CPU(s) 574, and memory controller 588 are, optionally, implemented on a single chip. In some other embodiments, they are, optionally, implemented on separate chips.

In some embodiments, power system 576 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 5, memory 502 of the remote user device preferably stores:

an operating system 504 (e.g., ANDROID, IOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a positional formation classifier 212 for determining and analyzing formations of players;

a historical training data store 214 for storing various statistics related to each sport 508, wherein each sport 508 including various team historical data 510 for one or more teams 512, as well as various player statistics 514 for one or more players 516; and a situational store 228 for storing data related to formations of players and game situations.

The positional formation classifier 212 (sometimes simply called a formation classifier) provides information related to various states and formations of players at any given point of time in game. For instance, in some embodiments the formation classifier 212 parses telemetry data 230 in order to determine pre-snap formations. Accordingly, once a formation is determined and telemetry data 230 is parsed, sub-categories of the formation may be determined (e.g., an I-formation with different sub-categories defining different running backs). Moreover, in some embodiments the formation classifier 212 acts as a virtual referee and determines if infractions have occurred within a game or play, such as a player being off-sides, a neutral zone infraction, an illegal motion, an illegal formation, and the like. In some embodiments, the formation classifier 212 includes one or more tables of various formations in a football game, such as a first table of offensive formations, a second table of defensive formations, and a third table of special teams formations. In some embodiments, the above table of formations provides some or all of the formations described by Table 1, Table 2, and Table 3.

TABLE 1

Exemplary Offensive Football Formations
Exemplary Formation

Double wing formation
Empty backfield formation
Goal line formation
I formation
Pistol formation
Pro set formation
Short punt formation
Shotgun formation
Single set back formation
Single wing formation
T formation
Tackle spread formation
V formation
Victory formation
Wing T formation
Wishbone formation

TABLE 2

Exemplary Defensive Football Formations
Exemplary Formation 38 formation
46 formation
2-5 formation
3-4 formation
4-3 formation
4-4 formation
5-2 formation
5-3 formation
6-1 formation
6-2 formation
Seven-man line formation
Nickle formation
Dime formation
Quarter formation
Half dollar formation

TABLE 3

Exemplary Special Teams Football Formations
Exemplary Formation

Field goal formation
Kick return formation
Kickoff formation
Punt formation

Additionally, in some embodiments the formation classifier 212 determines a ball carrier by comparing telemetry data 230 provided by the ball and telemetry data of a player that is closest to the ball. Likewise, in some embodiments determining which team has possession of the ball is conducted in a similar manner. Furthermore, in some embodiments the formation classifier 212 determines if a player is within a boundary of a game by analyses the telemetry data 230 extracted from the player and comparing this with the known boundaries of the field of play. In this way, the formation classifier 212 parses telemetry data 230 to provide a box score and/or automatic color commentary of a game.

While the formation classifier 212 is labeled a "neural net" it will be appreciated that the formation classifier 212 module does not have to perform classification of team formation using a neural network classifier. In some embodiments the formation classifier 212 module does in fact make use of any classification scheme that can discern a team formation from telemetry data. For instance, in some embodiments formation classifier 212 makes use of a nearest neighbor algorithm to perform the classification of team formation. In other embodiments formation classifier 212 makes use of clustering to perform the classification of team formation. In some embodiments the elucidation of the formation class by formation classifier 212 is used as a covariate in statistical models that predict the outcome of a current live game (e.g., win/loss, point spread, etc.) as disclosed with respect to methods and features described with respect to FIG. 8.

By way of non-limiting example the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm. When used for classification, SVMs separate a given set of binary labeled data training set with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space corresponds to a non-linear decision boundary in the input space. Tree-based methods partition the feature space into a set of rectangles, and then fit a model (like a constant) in each one. In some embodiments, the decision tree is random forest regression. One specific algorithm that can serve as the formation classifier 212 for the instant methods is a classification and regression tree (CART). Other specific decision tree algorithms that can serve as the formation classifier 212 for the instant methods include, but are not limited to, ID3, C4.5, MART, and Random Forests.

In some embodiments, the historical data store 214 stores statistics related to each sport 508, each team 510 within the sport league, as well as the respective players 512. As previously described, in some embodiments the data stored in the historical data store 214 is utilized as a training set of data for machine learning engine 210 and/or formation classifier 212. For instance, in some embodiments the data stored in the historical data store 214 is utilized as an initial data set at a start of a league, as in inferred from other data sets of similar league (e.g., using college football stats if a player is a professional rookie), or utilized to create data points if a new statistic is being generated (e.g., a previously unknown statistic becomes relevant). Furthermore, in some embodiments data from a previously played game is stored within the historical data store 214.

In some embodiments, the situation store 228 includes data stored in one or more databases of the machine learning engine 210 as a cache of information. This cache of the situation store 228 allows for data to be queried for and utilized rapidly, rather than having to query each respective database. In some embodiments, the situation store 288 creates a new cache of data for each respective game. However, the present disclosure is not limited thereto.

Figure 6:
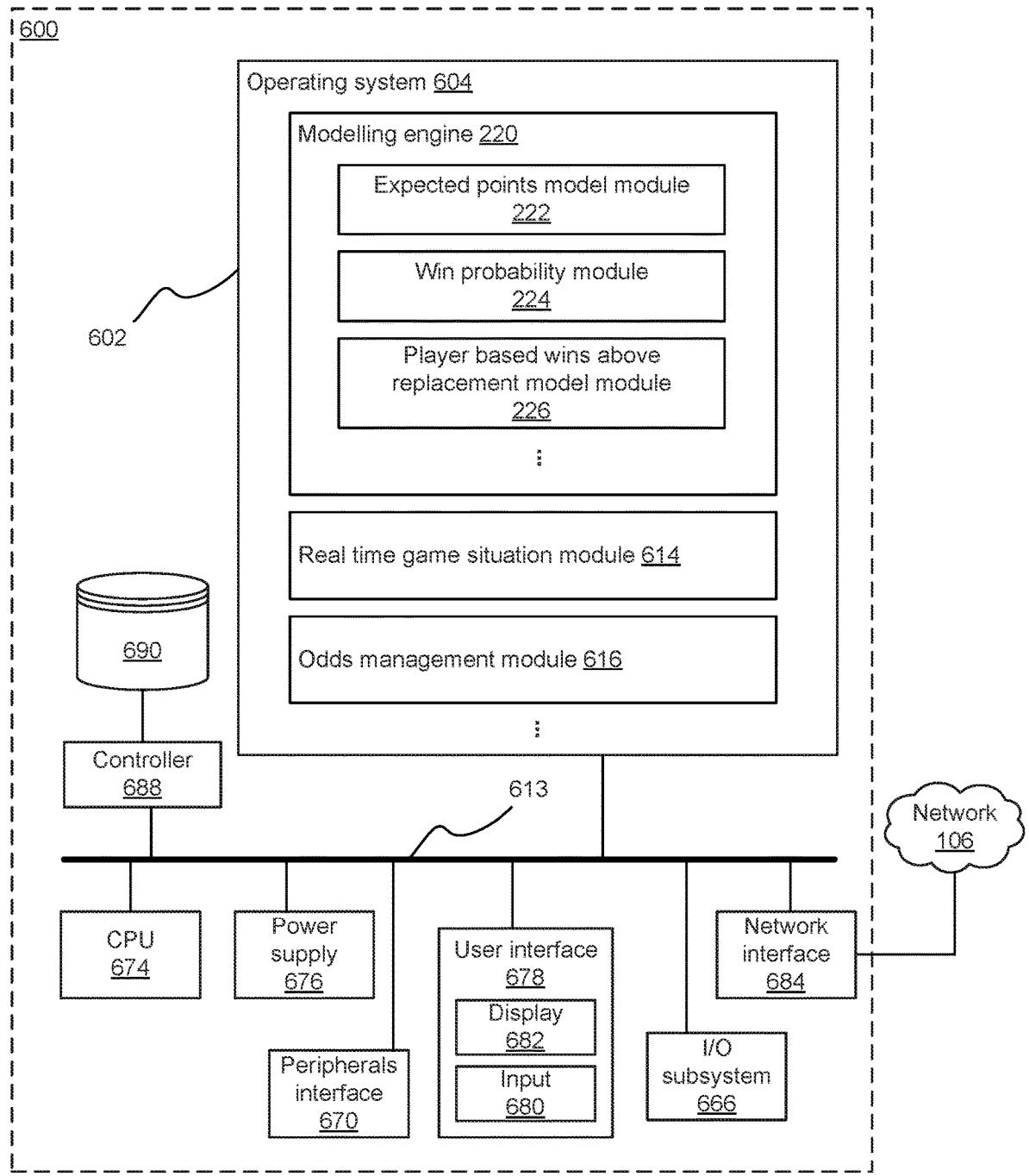
FIG. 6 is a block diagram illustrating an embodiment of an odds management system.

FIG. 6 is a block diagram illustrating an embodiment of an odds management system. Odds management system 600 stores and determines various odds in accordance with the present disclosure. The odds management system 600 includes one or more processing units (CPUs) 674, peripherals interface 670, memory controller 688, a network or other communications interface 684, a memory 602 (e.g., random access memory), a user interface 678, the user interface 678 including a display 682 and an input 680 (e.g., a key, board, a keypad, a touch screen, etc.), input/output (I/O) subsystem 666, one or more communication busses 613 for interconnecting the aforementioned components, and a power supply system 676 for powering the aforementioned components.

In some embodiments, the input 680 is a touch-sensitive display, such as a touch-sensitive surface. In some embodiments, the user interface 778 includes one or more soft key, board embodiments. The soft key, board embodiments may include standard (QWERTY) and/or non-standard configurations of symbols on the displayed icons.

It should be appreciated that odds management system 600 is only one example of a system that may be used in staring and determining various statistics, and that the odds management system 600 optionally has more or fewer components than shown, optionally combines two or more components, or optionally has a different configuration or arrangement of the components. The various components shown in FIG. 6 are implemented in hardware, software, firmware, or a combination thereof, including one or more signal processing and/or application specific integrated circuits.

Memory 602 optionally includes high-speed random access memory and optionally also includes non-volatile memory, such as one or more magnetic disk storage devices, flash memory devices, or other non-volatile solid-state memory devices. Access to memory 602 by other components of the odds management system 600, such as CPU(s) 674 is, optionally, controlled by memory controller 688.

Peripherals interface 670 can be used to couple input and output peripherals of the management system to CPU(s) 674 and memory 602. The one or more processors 674 run or execute various software programs and/or sets of instructions stored in memory 602 to perform various functions for the odds management system 600 and to process data.

In some embodiments, peripherals interface 670, CPU(s) 674, and memory controller 688 are, optionally, implemented on a single chip. In some other embodiments, they are, optionally, implemented on separate chips.

In some embodiments, power system 676 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 6, memory 602 of the remote user device preferably stores:

an operating system 604 (e.g., ANDROID, IOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a modelling engine 200 for storing one or more prediction or outcome models, the modelling engine including:

an expected points model module 222 for determining an expected points value of a scenario in a game, a win probability model 224 for determining a probably of winning a game, and a player based wins above replacement model module 226 for determining;

a real time game situation module 614 for receiving and communicating information related to a game currently being conducted; and an odds management module 616 for facilitation management of various odds and betting systems.

As previously described, the modelling engine 200 includes various algorithms and models utilized for generating statistics and predicting outcomes at a sports event. In some embodiments, these models include the expected points model 222 that provides a numerical value for each play of a game. For instance, if a drive in a game that results in a touchdown has plays that include a 5-yard rush, a 94-yard pass, and a 1-yard rush, even though the 1-yard rush resulted in the touchdown the 94-yard pass has a much more significant role in the drive. Thus, in some embodiments the 5-yard rush is allocated an expected points value of 0.5, the 94-yard pass is allocated an expected points value of 5.5, and the 1-yard rush is allocated an expected points value of 1, with high values indicating more important or game defining plays. In some embodiments modelling engine 200 uses the telemetry data collected in accordance with the present disclosure to predict the outcome of a game (e.g., win/loss, point spread, etc.) as disclosed with respect to methods and features described with respect to FIG. 8.

In some embodiments, the real time game situation module 614 receives information related to situations occurring in a game. This information is then utilized in adjusting various weights and values in the above described models. For instance, if a quarterback rolls his ankle and has to take every play from a shotgun position, this immobility of the quarterback will be reflected in the game models 220 through the real time game situation module 614.

Figure 7:
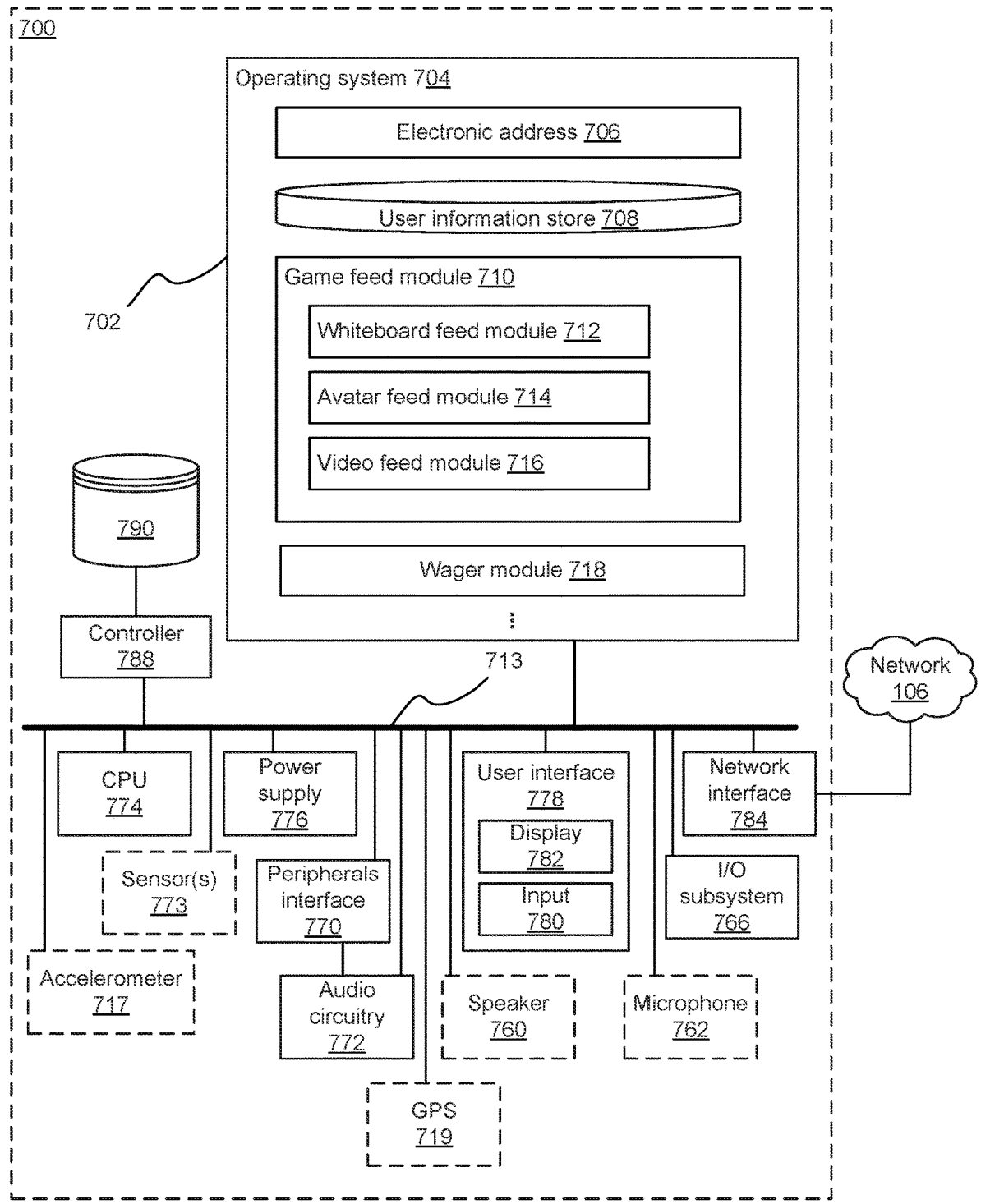
FIG. 7 is a block diagram illustrating an embodiment of a user device.

FIG. 7 is a block diagram illustrating an embodiment of a user device. User device is a remote user device 700 associated with an end user in accordance with the present disclosure. The user device 700 includes one or more processing units (CPUs) 774, peripherals interface 770, memory controller 788, a network or other communications interface 784, a memory 702 (e.g., random access memory), a user interface 778, the user interface 778 including a display 782 and an input 780 (e.g., a key, board, a keypad, a touch screen, etc.), input/output (I/O) subsystem 766, an optional accelerometer 717, an optional GPS 719, optional audio circuitry 772, an optional speaker 760, an optional microphone 762, one or more optional sensors 764 such as for detecting intensity of contacts on the user device 700 (e.g., a touch-sensitive surface such as a touch-sensitive display system of the device 700) and/or an optical sensor, one or more communication busses 713 for interconnecting the aforementioned components, and a power supply system 776 for powering the aforementioned components.

In some embodiments, the input 780 is a touch-sensitive display, such as a touch-sensitive surface. In some embodiments, the user interface 778 includes one or more soft key, board embodiments. The soft key, board embodiments may include standard (QWERTY) and/or non-standard configurations of symbols on the displayed icons.

It should be appreciated that the user device 700 is only one example of a device of a multifunction device that may be used by end users, and that the user device 700 optionally has more or fewer components than shown, optionally combines two or more components, or optionally has a different configuration or arrangement of the components. The various components shown in FIG. 7 are implemented in hardware, software, firmware, or a combination thereof, including one or more signal processing and/or application specific integrated circuits.

Memory 702 optionally includes high-speed random access memory and optionally also includes non-volatile memory, such as one or more magnetic disk storage devices, flash memory devices, or other non-volatile solid-state memory devices. Access to memory 702 by other components of the user device 700, such as CPU(s) 774 is, optionally, controlled by memory controller 788.

Peripherals interface 770 can be used to couple input and output peripherals of the management system to CPU(s) 774 and memory 702. The one or more processors 774 run or execute various software programs and/or sets of instructions stored in memory 702 to perform various functions for the user device 700 and to process data.

In some embodiments, peripherals interface 770, CPU(s) 774, and memory controller 788 are, optionally, implemented on a single chip. In some other embodiments, they are, optionally, implemented on separate chips.

In some embodiments, audio circuitry 772, speaker 760, and microphone 762 provide an audio interface between a user and the device 700. The audio circuitry 772 receives audio data from peripherals interface 770, converts the audio data to an electrical signal, and transmits the electrical signal to speaker 760. Speaker 760 converts the electrical signal to human-audible sound waves. Audio circuitry 772 also receives electrical signals converted by microphone 762 from sound waves. Audio circuitry 772 converts the electrical signal to audio data and transmits the audio data to peripherals interface 770 for processing. Audio data is, optionally, retrieved from and/or transmitted to memory 702 and/or RF circuitry 784 by peripherals interface 770.

In some embodiments, power system 776 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 7, memory 702 of the remote user device preferably stores:

- an operating system 704 (e.g., ANDROID, IOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- an electronic address 706 that is used to identify a particular user device during communications with various systems and devices of the present disclosure;
- a user information store 708 that stores pertaining information related to the respective user associated with the corresponding user device 700, such as user access information including usernames, user passwords, access tokens, etc.;
- a game feed module 710 for viewing various representations of a game including a whiteboard feed module 712, an avatar feed module 714, and a video feed module 716 as well as viewing various statistics related to the game; and
- a wager module 718 that facilitates placing wagers on game scenarios.

Figure 8:
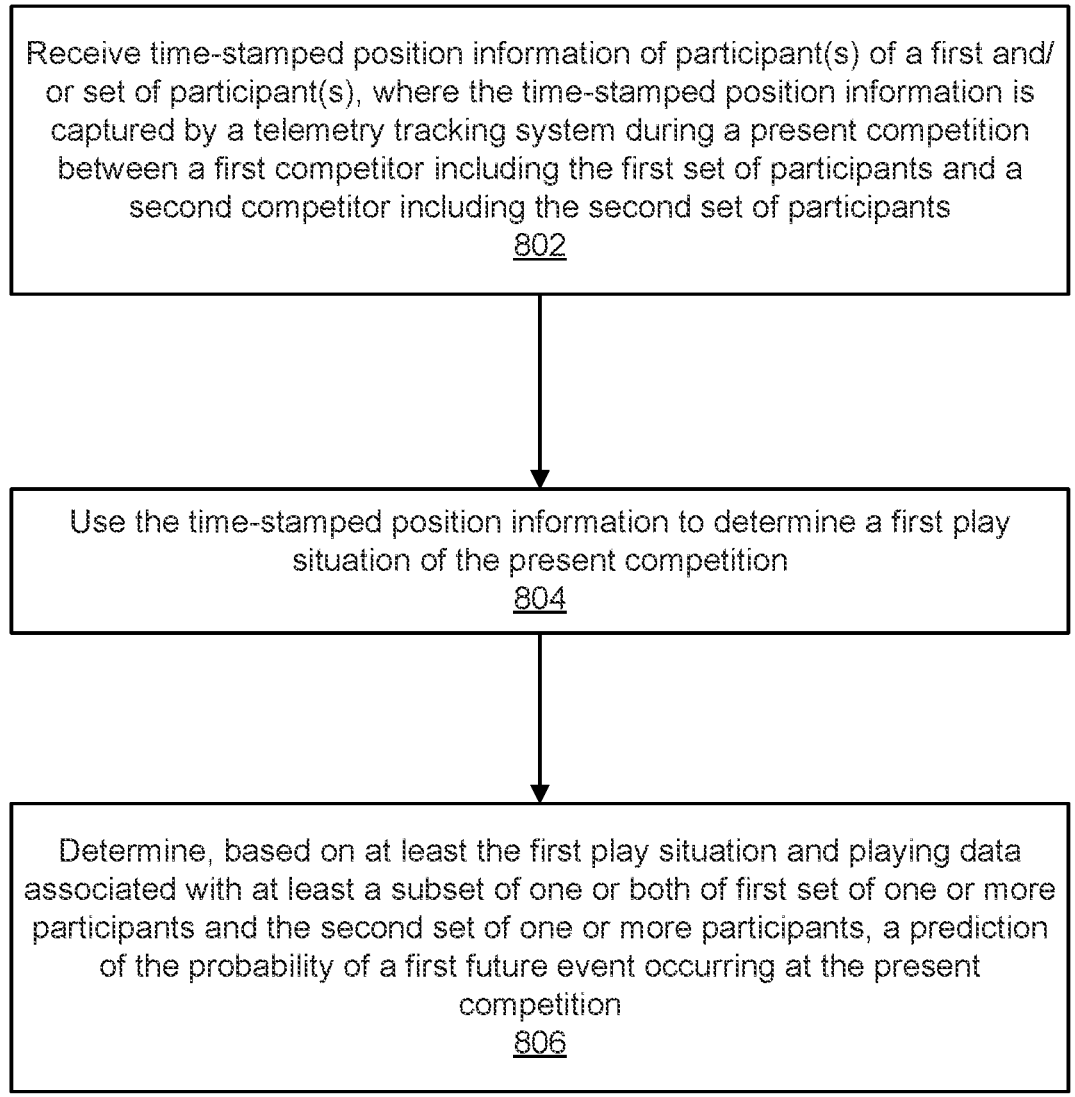
FIG. 8 is a flow chart illustrating an embodiment of a process to make use of telemetry tracking devices to enable event based analysis at a live game.

In some embodiments wager module 718 uses the telemetry data collected in accordance with the present disclosure to predict the outcome of a current game using extended covariants (e.g., win/loss, point spread, etc.), as disclosed with respect to methods and features described with respect to FIG. 8. In some embodiments, wager module 718 uses the telemetry data collected in accordance with the present disclosure to provide odds for future game events in a current live game.

Now that a general topology of the system 48 has been described, methods for making use of telemetry tracking devices to enable event based analysis at a live game will be described with reference to, at least, FIGS. 1 through 7.

FIG. 8 is a flow chart illustrating an embodiment of a process to make use of telemetry tracking devices to enable event based analysis at a live game. This process may be implemented by processor 100 in cooperation with the other devices of system 48 described above. The process can be performed to making use of telemetry tracking devices to enable event based analysis at a live game. The event based analysis may include predicting an outcome such as the final outcome of a game, the winner or loser of the competition or a final score, or an intermediate outcome, such as yards gained on the next play or points expected to be scored in a current drive. The present competition can be a live sport event such as a live football game.

At 802, time-stamped position information of one or more participants of one or both of the first set of participant(s) and the second set of participant(s) in the present competition is received, the time-stamped position information captured by a telemetry tracking system during the present competition. An example of a telemetry tracking system is a system including the tracking device management system 400, the tracking devices 300, the anchor devices 120, as described above with respect to FIGS. 1-5. The time-stamped position information includes an xy- or xyz-position of each participant of a first subset and a second subset of players with respect to a predefined space (e.g., a game field, such as a football field).

The first subset and the second subset can include any number of participants such as each subset including one participant, each subset including two or more participants, or each subset including all the participants of the first competitor and the second competitor, respectively, that are on the field during the first time point.

At 804, the time-stamped position information is used to determine a first play situation of the present competition, e.g., a current play situation. In various embodiments, the play situation is determined using, at least in part, time-stamped position information of each of the players in the subsets of players at the given time. For example, the process determines the play situation at a first time point which is a current time of a competition while the competition is ongoing, and the time-stamped position information has been collected by a telemetry tracking system at the present competition through the first time point.

In various embodiments, determining the play situation uses a set of parameters including a current down, a number of seconds remaining in a current half, yards from end zone and/or any parameters describing the play situation at the given. In some embodiments, the data describing the play situation of the live sport event further includes one or more covariates of Table 4. The covariates of Table 4 describe abilities of individual players. For example, a quarterback of a team is evaluated by covariates including aggressiveness and/or distance between a player and the quarterback per pass attempt. A wide receiver of a team is evaluated by covariates including cushion between the receiver and defensive backs, a distance travelled, a percentage out-breaking route, and yardage per route. A tight end of a team is evaluated by covariates including pulls, a percentage out-breaking route, missed blocks, and a distance travelled. For example, the covariates related to the quarterback and/or the wide receiver are used to predict the probability that the next event in the live sport event is an attempt to pass the ball or to run the ball.

A play situation is described by a set of covariates denoted with X. An example of a set of covariates includes, at least, the current down (e.g., 1st, 2nd, 3rd, or 4th), a number of seconds remaining in the present half and yards from end zone ranging from 0 to 100 at a given time. The set of covariates describing the play situation may also include time-stamped positions of players of each team at the given time. In various embodiments, the time-stamped position is derived from information captured by a telemetry tracking system (e.g., a system including the tracking device management system 400, the tracking devices 300, the anchor devices 120, as described above with respect to FIGS. 1-5). The telemetric tracking system provides detailed data describing positions of tracked players for each team. In some embodiments, the set of covariates includes positions of a subset of the players of each team (e.g., a subset includes one or more players).

The position may be defined as an xy- or xyz-coordinate for each player with respect to a predefined space, such as a field where the sport event occurs (e.g., a football field). The player configuration includes positions of the player with respect to each other, as well as with respect to the yard line and/or game field. Such positional data is used for recognizing patterns for deriving player configurations in play situations as well as for tracking next events (e.g., is the ball advanced to the right, to the left or down in the middle).

In various embodiments, determining a prediction of the probability of a first future event includes using historical playing data of one or more participants in one or both of the first set of participant(s) and the second set of participant(s). That is, the process determines a prediction of the probability of a first future event occurring at a live sport event based upon at least (i) the playing data, (ii) the play situation and (iii) the historical playing data. Historical data refers to play-by-play data that specifies data describing play situations and next play events that have occurred after each play situation. The historical play-by-play data includes historical outcomes of next plays from given player configurations. For example, the historical play-by-play data includes a plurality of next play events that have occurred after a given play situation. For football, the given play situation includes the player's configuration in the field, a current down, a number of seconds remaining in a current half and yards from end zone.

In some embodiments, such historical data also includes data collected so far during a live sport event (e.g., a live football game). In some embodiments, the historical data further includes play-by-play data recorded and published by the NFL (e.g., data published at NFL.com).

With reference to FIG. 2A, historical playing data is stored at historical data store 214 for each participant of at least the first and second subset of participants in a plurality of historical games in the league. In some embodiments, the historical data is used to identify historical play situations corresponding to the play situation at the first time point, and providing a prediction of the next event based on the historical play events that have occurred after similar play situations. In some embodiments, the historical playing data includes player telemetry data for each player of at least the first and second subset of players in the plurality of historical games in the league. In some embodiments, the historical playing data includes historical states for player configurations. The current play situation with the present player configuration is compared with the historical states for player configurations to determine a prediction of the next event in the present game. In some embodiments, the historical playing data includes historical statistics for each player of the first set of players of the first team and the second set of players of the second team (e.g., the historical statistics include covariates of Table 4 and/or Table 5 describing individual abilities of players). In some embodiments, the historical states for each player configuration of the player configurations includes player types included in the respective player configuration or a subset of the player types included in the respective player configuration. In some embodiments, the plurality of historical games spans a plurality of seasons over a plurality of years. In some embodiments, the plurality of historical games includes a number of games ranging from ten games to one thousand games (e.g., 10, 50, 100, 250, 500, 750, or 1000 games). The historical playing data may be for the same type of sport or a competition involving the first and second competitors. The first and second competitors may have different team members compared with a current configuration of the team or may have some of the same team members.

At 806, the process determines a prediction of the probability of a first future event occurring at the present competition based on at least the first play situation and playing data associated with at least a subset of one or both of first set of one or more participants and the second set of one or more participant.

In reference to FIG. 2, a play situation can be determined using a formation classifier 212. For example, a formation classifier outputs formation information (e.g., which offensive formation and defensive formation the respective teams appear to be in) that can be used with individual player information (e.g., individual stats and current position, matchups, which defensive back is opposite a given receiver) and other factors (e.g., time left in the period, which period, which down, yards to first down, yards to end zone, current score) to predict outcome of the play (e.g., yards gains, first down, expectation of whether a team will score or not). Suppose a QB is part of an offensive formation, the individual player information indicates that he is likely fatigued (e.g., based on increased heart rate, number of yards rushed in the current game vs. historical performance after rushing that many yards, etc.), and he is 80 yards from the end zone. This play situation is determined and can be used to predict that the chance of a touchdown is low.

The playing data includes data related to each of the players and/or to the team. For example, the playing data includes intrinsic data related to each of the players, e.g., data relevant to abilities and/or condition of a respective player. In some embodiments, the playing data includes a heart rate, a height, an age, a weights, a draft round pick, or any other data relevant to the abilities and/or condition of the respective player. Such data describes a respective player's abilities. For example, a tracking device 130 includes, or is in communication with, one or more heart rate monitoring devices configured to monitor a heart rate of a respective player wearing the tracking device 130. System 48 receives the heart rate from the tracking device 130. The heart rate may provide an indication of the player's current abilities, e.g., a level of tiredness or exhaustion during the game. Such information is used by the system 48 for predicting the probability of the first future event in the present competition.

For a game of American football, in some embodiments the first subset of players and the second subset of players are selected from a quarterback, (QB), a running back, (RB), a wide receiver, (WR), a tight end, (TE), a center, (C), an offensive guard, (OG), an offensive tackle, (OT), a middle linebacker, (MLB), an outside linebacker, (OLB), a defensive end, (DE), a defensive tackle, (DT), a cornerback, (CB), a safety, (S), a kicker, (K), a holder, (H), a long snapper, (LS), a punter (P) or a kick/punt returner. These positions are merely exemplary and not intended to be limiting. For instance, in some embodiments one or more of the above described player positions is further categorized by sub-positions (e.g., a linebacker being categorized as an outside linebacker (OB) or a middle linebacker (MB))

As another example, the playing data includes team data, e.g., team strength, passing success, running success, or red zone offense/defense rating, which are not necessarily intrinsic to an individual player but rather a characteristic of a team as a whole.

In various embodiments, the prediction of the probability of a first future event occurring is determined by the statistical methods described below with respect to Equations 1-4. The future event is a scoring event or a non-scoring event. For a football game, the scoring events include a touchdown made by the first team or the second team, a field goal made by the first team or the second team, or a safety made by the first team or the second team. For a football game, examples of a prediction of a non-scoring event include a prediction of (i) whether the team in possession of the ball will attempt to advance the ball to the left in the next play, (ii) whether the team in possession of the ball will attempt to advance the ball down the middle in the next play (iii) whether the team in possession of the ball will attempt to advance the ball to the right in the next play, (iv) whether the team in possession of the ball will attempt to pass the ball in the next play, (v) whether the team in possession of the ball will attempt to run the ball in the next play, (vi) whether the team in possession of the ball will score a touchdown before losing possession, of the ball to the opposing team, (vii) achieving a next down, (viii) turnover, (ix) gaining or losing a threshold number of yards, (x) pass completion, etc. In some embodiments, the prediction of the first future event is provided as a combination of a probability that the next score event is a touchdown, a probability that the next score event is a field goal and a probability that the next score event is a safety made by one of the first team and the second team.

A variety of statistical methods may be used to predict the probability of a first future event occurring. Two example statistical approaches will now be discussed-expected points (EP) and win probability (WP). Expected points frameworks provide an evaluation of a play outcome using historical playing data to find the number of points scored by teams in similar play situations. Win probability frameworks provide an evaluation of an overall game outcome using historical data to find how often teams in similar situations have won the game.

Table 4 includes examples of internal covariates derived from a play-by-play data derived from a telemetry tracking system in some embodiments, such as a telemetry tracking system described with respect to FIGS. 1-7 for a football game. For example, a quarterback of a team is evaluated by covariates including aggressiveness and/or distance between a player and the quarterback per pass attempt. A wide receiver of a team is evaluated by covariates including cushion between the receiver and defensive backs, a distance travelled, a percentage outbreaking route, and yardage per route. A tight end of a team is evaluated by covariates including pulls, a percentage outbreaking route, missed blocks, and a distance travelled. In some embodiments, the internal covariates include variables derived from historical play-by-play data, such as that published by the NFL.

In various embodiments, the covariate parameters can be based on one or more of telemetry of a present competition, historical telemetry, telemetry associated with one or more competitors, and/or external factors (external to one or more competitors) such as weather, among other things.

Table 5 summarizes variables published by the NFL used for evaluating players and/or team strength. In some embodiments, the internal covariates for evaluating the team strengths include (i) a season-to-date summary of the passing yards, (ii) a season-to-date summary of the rushing yards, (iii) a season-to-date fumble rate, and (iv) a season-to-date interception rate.

TABLE 4

Covariates derived from play-by-play telemetric data.

| Statistic (Covariate) | Derivation | Analytical Use |
| --- | --- | --- |
| Aggressiveness of player | Determined, at least, by comparing completion rate of QB with respect to a distance between a receiver and a defensive player. | Determines probability of quarterback attempting a pass in a high risk situation etc. |
| Average velocity, acceleration, jerk | Determined, at least, by derivatives of positional telemetry data of each respective player or accelerometer. | Determines player fatigue throughout a game, determines optimal offensive and defensive player matchups, agility of a player, etc. |
| Ball distance | Determined, at least, by positional telemetry data. | Determines lateral movement in comparison to actual yardage (e.g.., a lateral vs a forward pass), etc. |
| Ball speed | Determined, at least, by derivative of positional telemetry data of the ball. | Determines quarterback throwing speed, etc. |
| Blocking assignment expectations | Determined, at least, by comparing formation of players before each play, throughout | Determines expected blocking assignments to predict a screen, a rushing gap, etc. |

TABLE 4-continued

Covariates derived from play-by-play telemetric data.

| Statistic (Covariate) | Derivation | Analytical Use |
|---|---|---|
| | each player, and/or after each play to determine each expected blocking assignment for a respective formation. | |
| Burst speed from line of scrimmage | Determined, at least, by telemetry data received from each player after crossing the line of scrimmage. | Determines how quickly a rusher can break through the line of scrimmage (e.g., a lower burst yields a lower probability of sack), etc. |
| Coverage type | Determined, at least, by comparing telemetry data for each respective offensive and/or defensive formation. | Determines probability of a zone coverage or man coverage by offensive formation and/or defensive formation, etc. |
| Cushion between players | Determined, at least, by comparing telemetry data from an offensive player and a defensive player for a respective play. | Determines probability and/or size of a distance between two or more respective players in a play (e.g., probability a receiver creates a gap between a defensive player), etc. |
| Defenders in Box | Determined, at least, by telemetry data from one or more defensive players at a start of a play. | Determines probability of formation, coverage type, and expected formation progression during a play, etc. |
| Distance between player and quarterback per pass attempt | Determined, at least, by comparing telemetry data from one or more players and the quarterback. | Determines pressure on quarterback, effectiveness of offensive line, etc. |
| Distance between relative players | Determined, at least, by comparing telemetry data from two or more players. | Determines best matchups between players, pressure on quarterback, etc. |
| Distance travelled | Determined, at least, by telemetry data from a respective player. | Determines lateral movement (e.g.., a north to south running back versus a speed back), total distance covered by a player per play, per game, etc. |
| Double-team percentage | Determined, at least, by telemetry data from two or more respective players. | Determines double team efficiency per player and/or per opponent, probability of a double team for each formation, etc. |
| Positional heat maps | Determined, at least, by mapping telemetry data over a period of time | Determines normalized progression of each player's position on the field for each respective play and/or game. |
| Formation success in huddle and/or in hurry-up situation | Determined, at least, by comparing telemetry data of one or more players at a start of a play with a result of the play. | Determines success rate of using a huddle and/or hurry up offensive for each player, each formation, etc. |
| Broken tackles | Determined, at least, by comparing telemetry data of two or more players during a respective play. | Determines probability a player will break a tackle, determines optimal tackling position (e.g., a high tackle, a low tackle, etc.), etc. |
| Hurdles Expectancy | Determined, at least, by comparing telemetry data of two or more players during a respective play (e.g., two opposing players having same X, Y telemetry data but different Z telemetry data at a particular point in time. | Determines probability of a player attempting a hurdle (e.g., a hurdle in an open field, a quarterback leap), success rate of hurdling, etc. |
| Defender coverage type | Determined, at least, by mapping defensive telemetry data over a period of time for each respective play. | Determines probability a defender using a press coverage, a deep coverage, for each formation. |
| Max speed | Determined, at least, by detecting a highest velocity of a respective player. | Determines optimal matchups against respective players and/or respective routes, player fatigue, etc. |
| Missed blocks | Determined, at least, by comparing telemetry data of two opposing players over a period of time during a play. | Determines a missed block occurrences. |

TABLE 4-continued

Covariates derived from play-by-play telemetric data.

| Statistic (Covariate) | Derivation | Analytical Use |
|---|---|---|
| Probability of blocking, running, and/or receiving during a passing play | Determined, at least, by mapping telemetry data of one or more players during each respective play. | Determines probability of a running back blocking, receiving, or running for each respective formation, etc. |
| Probability of a completion | Determined, at least, by comparing telemetry data of one or more players at a start of a play. | Determines preferred routes for receivers, probability of a completion per route, per formation, per opposing player matchups, etc. |
| Probability of breaking route | Determined, at least, by mapping telemetry data over a period of time. | Determines probability of a pass and/or route being an out-breaking route (e.g., towards a side line) or an in-breaking route (e.g, towards a middle of a field), etc. |
| Probability of open receiver | Determined, at least, by comparing telemetry data for each receiving and each defender for a respective formation. | Determines how often each receiver is open for each route and/or against each defender (e.g, success rate in man coverage against a respective defender), etc. |
| Probability of blitz | Determined, at least, by comparing telemetry data of one or more players at a start of a play. | Determines expected defense blitz tendency for each respective formation (e.g, probability of blitz in a passing formation, probability of blitz in a rushing formation, etc.), etc. |
| Third downs played | Determined, at least, by comparing telemetry data of one or more players with a game clock. | Determines if a player is used in third down situations (e.g, an RB is a "third down back"), etc. |
| Probability of rushing direction | Determined, at least, by mapping telemetry data of one or more players during a period of time. | Determines expected rushing routes (e.g, rushing away from offensive line, rushing through offensive line, rushing towards sideline, etc.), etc. |
| Probability of a pull | Determined, at least, by mapping telemetry data of one or more players over a period of time. | Determines probability of an offensive lineman pulling to other side to of the offensive line (e.g, pulling), etc. |
| Route combination expectations | Determined, at least, by comparing telemetry data at a start of a player with historical formation data. | Determines each expected receiver or rushing route combination for a respective formation, etc. |
| Rusher time behind line of scrimmage | Determined, at least, by mapping telemetry data of one or more players over a period of time. | Determines probability that a rusher is blocked at the line of scrimmage, average amount of time a defender is across the line of scrimmage, etc. |
| Sacks allowed in respective situations | Determined, at least, by comparing telemetry data for each play. | Determines probability of a sack per formation (e.g, sacks in rushing formation, sacks in passing formation), etc. |
| Tackles location | Determined, at least, by comparing telemetry data at an end of a play. | Determines probability of location of tacking a ball carrier, etc. |
| Targets by coverage type | Determined, at least, by comparing telemetry data from one or more player with telemetry data from the ball during a period of time. | Determines probability of a catch by each type of coverage, probability of a being targeted with a pass by each type of coverage, etc. |
| Targets by route | Determined, at least, by comparing telemetry data from one or more player with telemetry data from the ball during a period of time. | Determines probability of a catch by each route, probability of a being targeted with a pass by each type of route, etc. |
| Tendency to chop block | Determined, at least, by mapping telemetry data from two or more opposing players during a period of time. | Determines expected type of block. |

TABLE 4-continued

Covariates derived from play-by-play telemetric data.

| Statistic (Covariate) | Derivation | Analytical Use |
|---|---|---|
| Tendency to juke, spin, stiff arm, etc. | Determined, at least, by telemetry data from one or more players over a period of time. | Determines probability a player will juke, spin, stiff arm, etc. if facing a defender. |
| Tendency to sweep | Determined, at least, by mapping telemetry data from one or more offensive players during a period of time. | Determines probability of a wide receiver going into motion for each formation, etc. |
| Three down patterns | Determined, at least, by comparing telemetry data with historical formation data. | Determines probability of a pattern of passing plays and/or rushing plays (e.g., Pass-Pass-Pass, Pass-Pass-Run, Pass-Run-Pass, Pass-Run-Run, etc.) |
| Time to breach line of scrimmage for a sack and/or pass | Determined, at least, by comparing a period of time to breach line of scrimmage with a period of time to pass the ball per formation. | Determines probability of sack, amount of time to complete a pass before a sack, etc. |
| Yardage per route | Determined, at least, by mapping telemetry data from one or more players over a period of time. | Determines how each route is run (e.g., a shallow route, a deep route, etc.), average yardage per completed route, etc. |

TABLE 5

Covariates derived from historical play-by-play data published by the NFL.

| Statistic (covariate) | Description |
|---|---|
| Games | The number of games a player has played at a given position, the number of games a player has played in total, etc. |
| Games Started | The number of games in which a player has started in a game at that position. |
| Passing Attempts | Number of times a player throws the ball forward, attempting to compete a pass. |
| Passing Completions | Number of times a player completes a pass to another player that is eligible to catch a pass. |
| Passing Yards | Total yards gained passing the ball for each play, for each formation, for each game, etc. |
| Passing Touchdowns | Number of completed passes resulting in a touchdown. |
| Interceptions | If a player intercepts a pass from the offensive player who threw it. |
| Longest Pass | Total yards of the longest pass play. |
| Sacks Allowed | Number of times the quarterback is tackled behind the line of scrimmage. |
| Sack Yardage | Total number of yards lost if the quarterback was sacked by the defense. |
| Fumbles | Number of times the player drops the football before a play is completed. |
| Fumbles Lost | Number of times the player loses possession of the football after fumbling the ball. |
| Completion Percentage | Percentage of completed passes. |
| Yards per Passing Attempt | Average number of yards gained per passing attempt. |
| Touchdown Percentage | Percentage of pass attempts that result in a touchdown. |
| Interception Percentage | Percentage of pass attempts that result in an interception. |
| Rushing Yards | Total rushing yards gained by a player. |
| Rushing Attempts | Number of times the player attempted to rush. |
| Rushing Touchdowns | Number of completed rushes resulting in a touchdown. |
| Longest Rush | Total yards of the longest rushing play. |
| Yards per Rushing Attempt | Average yards a player gains across the rushes the player conducted. |
| Receptions | Number of times a player catches a forward pass. |
| Catches | Number of times a player catches a forward or lateral pass. |
| Receiving Yards | Total yards gained in catching the ball. |
| Yards after Catch | The forward yardage gained from the spot of the reception until the receiver is downed, runs out of bounds, scores, or loses the ball. |
| Yards per Reception | Average yards per reception. |
| Dropped Passes | Number of catchable balls a receiver drops. |
| Tackles Solo | Number of times a player singlehandedly takes down the ball carrier. |
| Tackles Assist | Number of times a player takes down a ball carrier with help from another player. |
| Tackles for Loss Solo | Number of solo tackles made by a player for a loss of yards. |
| Tackles for Loss Assist | Number of assisted tackles for a loss of yards. Does not include sacks. |
| Tackles for Loss Yards | Total yards lost from tackles made by a player. |
| Sacks Solo | Number of times a single player tackles the quarterback behind the line of scrimmage. |
| Sacks Assist | Number of times a player sacks the quarterback with help from another player. |
| Sack Yards | Total yards lost from sacks. |
| Passes Defended | Any pass that a defender, through contact with the football, causes to be incomplete. |
| Forced Fumbles | Number of times a player forces the player with the ball to lose it. |
| Fumble Recoveries | Number of times a player recovers a loose ball. |
| Fumble Return Yards | The yards accumulated after a ball has been fumbled, then recovered. |
| Hurries | Number of times a player forces the quarterback to throw the football before the quarterback is ready. |
| Safeties | Number of times a player scores two points by tackling an opponent in possession of the ball in his own end zone. |

TABLE 5-continued

Covariates derived from historical play-by-play data published by the NFL.

| Statistic (covariate) | Description |
|---|---|
| Blocks | Number of times a player blocks a punt or kick. |
| Interception Return Yardage | Number of yards compiled by a defensive player returning one or more interceptions. |
| Average Yards per Interception | Average number of yards gained after intercepting the football. |
| Field Goals Made | Number of good kicks between the goal posts. |
| Field Goals Attempted | Number of attempts by kicker to kick the ball between the goal posts. |
| Field Goal Percentage | Percentage of kicks made by a player that score points. |
| Field Goal Long | Longest kick made by a player or team. |
| Field Goals Blocked | Number of kicks a player or team. |
| Kickoffs | Total number of times a kicker kicked off. |
| Kickoff Yards | Total yards from kickoffs made by a kicker. |
| Kickoffs Out of Bounds | Number of kickoffs that go out of bounds. |
| Kickoff Yards Average | The average yards of kickoffs made by a kicker. |
| Kickoff Touchbacks | The number of kicks that land in the end zone or end up rolling into the end zone and are not returned. |
| Kickoff Touchback Percentage | Percentage of kickoffs that result in a touchback. |
| Onside Kicks | Number of times a kicker attempted a 10-yard kick in hopes of being recovered by the kicking team. |
| Onside Kicks Recovered | Number of 10-yard kickoff attempts recovered by the kicking team. |
| Punts | Number of punts made by a player. |
| Punting Yards | Total punt yards made by a player. |
| Yards per Punt | Average yards per punt made by a player. |
| Longest Punt | Longest punt made by a player. |
| Punt Touchbacks | Plays in which the ball is ruled dead on or behind a team's own goal line after a kickoff, punt, interception, or fumble. |
| Punting Touchback Percentage | Percentage of punts resulting in a touchback. |
| Punting Inside 20 | Punts downed inside the 20-yard line. |
| Punting Inside 20 Percentage | Percentage of punts downed inside the 20-yard line. |
| Blocked Punts | Number of punts blocked by a player. |
| Punts Returned | Number of punts returned. |
| Punts Returned Yardage | Total yardage returned. |
| Yards per Punt Return | Average yards per return. |
| Kick/Punt Return Yards | Yards returned. |
| Kick/Punt Return Attempts | Number of kicks and/or punts returned. |
| Kick/Punt Return Touchdowns | Returns resulting in a touchdown. |
| Kick/Punt Return Fair Catches | Player returning a punt signals by waving his extended arm from side to side over his head, making it illegal for the opposition to tackle him. |
| Longest Kick/Punt Return | Longest single return yardage. |
| Yards per Kick/Punt Return | Average Return Yardage. |
| Points Scored | Points for (scored). |
| Points Allowed | Points against (allowed). |
| Total Yards | Total yards (pass and rush combined). |
| Time of Possession | Amount of time a team has possession of the football. |
| Total Number of First Downs | Total number of first downs. |
| Third Down Conversions | Number or percentage of third down conversions made by a team. |
| Third Down Attempts | Number or percentage of third down attempts made by a team. |
| Fourth Down Conversions | Number or percentage of fourth down conversions made by a team. |
| Fourth Down Attempts | Number or percentage of fourth down attempts made by a team. |
| Turnovers | Number of turnovers committed and/or received by a team. |
| Number of penalties committed | Number of penalties committed by the team or player. |
| Total yards from penalties committed | Total yards from penalties committed by the team or player. |

In some embodiments, external covariates are included in the model similarly to internal covariates, while in other embodiments external covariates are omitted from the covariate analyses and model.

The set of covariates denoted with X describing the play situation is used for determination of determining a prediction of a probability of a next event. The response variable Y is an element of all the scoring events from a point of view of a team, as is expressed by Equation 1:

$$Y \in \{\text{Touchdown}(7), \text{Field Goal}(3), \text{Safety}(2), \text{No Score}(0), -\text{Touchdown}(-7), -\text{Field Goal}(-3), -\text{Safety}(-2)\}, \quad (1)$$

The scores included in the response variable Y are provided from the point of view of a team having a possession of the ball at a given time. The positive scores correspond to scores obtained by the team having the possession of the ball and the negative scores correspond to scores obtained by an opposing team. The probability for each of the possible scoring events correspond to P(Y=y|X), where y describes the scoring events. The multinomial logistic regression model is defined with six logit transformations relative to the "no score" (0 points) event according to Equation 2:

$$\log\left(\frac{P(Y = \text{Touchdown} \mid X)}{P(Y = \text{No Score} \mid X)}\right) = X \cdot \beta_{Touchdown} \quad (2)$$

$$\log\left(\frac{P(Y = \text{Field Goal} \mid X)}{P(Y = \text{No Score} \mid X)}\right) = X \cdot \beta_{Field\ Goal}$$

$$\log\left(\frac{P(Y = -\text{Touchdown} \mid X)}{P(Y = \text{No Score} \mid X)}\right) = X \cdot \beta_{-Touchdown}$$

where $\beta_y$ is the corresponding coefficient vector the respective scoring events. The EP for a play is calculated by multiplying each event's predicted probability with its associated scoring event y, as described by Equation 3:

$$EP = E[Y|X] = \Sigma_y y \cdot P(Y=y|X) \quad (3)$$

In some embodiments, it is useful to add weighting to the plays to correct for certain scenarios in football games. For example, in a play situation where a team is leading by a large number of points at the end of a game, the leading team will sacrifice scoring points for letting time run off the clock. A large difference in scoring points thereby affects the next points scored and should be taken into account in the model by weighing. A weight is provided by Equation 4:

$$w_i = w(S_i) = \frac{\max_i(|S_i| - |S_i|)}{\max(|S_i|) - \min(|S_i|)} \quad (4)$$

where $w_i$ is a weight based on the score differential S from zero to one.

Similarly, a difference in the number of drives between the play and the next score can be taken into account in the model by weighing. The difference is defined as Di=dnext score−di, where dnext score and di are the drive number for the next score and play i, respectively. Di is considered to be zero for cases where the play and the next score occur in different half times or the play and the next score occur in the second half time and overtime, respectively. The two weights, or any other weight parameters, are added together and scaled to one resulting in a combined weighting scheme. In some embodiments, the combined weighting scheme is adjusted to have an unequal balance.

Different covariates are evaluated for their usefulness in producing predictions in the expected points framework by using a calibration testing. The calibration testing compares the estimated probability of each of the second scoring events from the multinomial regression model to actual scoring events using historical play-to-play data. The estimated probability is binned in percent (e.g., five percent) increments, having an associated error $e_{y,b}$, as defined by Equation 5:

$$e_{y,b}=|\hat{P}_b(Y=y)-P_b(Y=y)|, \quad (5)$$

where y is a scoring event, the bins are noted with b, and $\hat{P}_b(Y=y)$ and $P_b(Y=y)$ are the predicted and observed probabilities, respectively, in bin b. The overall calibration error $e_b$ for scoring event y is calculated by averaging $e_{y,b}$ over all the bins, weighted by the number of plays in each bin $n_{y,b}$, as expressed in Equation 6:

$$e = \frac{1}{n_y}\sum\nolimits_b n_{y,b}\cdot e_{y,b}, \quad (6)$$

where $n_y=\Sigma_b\, n_{y,b}$. The average of the seven calibration errors $e_y$ provides the overall calibration error in Equation 7:

$$e = \frac{1}{n}\sum\nolimits_y n_y\cdot e_y, \quad (7)$$

where n corresponds to the number of total plays.

The EP model described hereinabove provides an estimate of a probability of next scoring events. However, similar model can be applied for estimating a probability of next non-scoring events by writing Equation 2 for non-scoring events.

The win probability for a given play during a live sport event is evaluated by taking estimates for the expected points and including variables describing the play situation. Such variables include, but are not limited to, expected score differential (E [S]=EP+S), where S is the score differential at the beginning of a given play of the live sport event), number is seconds remaining in the game (sg), an expected score time ratio E/S/(sg+1), a current half of the game (e.g., 1st, 2nd, or overtime), and a number of seconds remaining in the current half (sh). Additionally, optionally, the variables include an indicator for whether or not time remaining is under two minutes (u). time outs remaining for offensive (possession) team (toff) and time outs remaining for defensive team (tdef).

In some embodiments, a generalized additive model (GAM) is used to estimate the possession team's probability of winning the game taking into account the current play situation, e.g., defined by the variables describing the play situation. An example of such a is expressed by Equation 8:

$$\log\left(\frac{P(\text{Win})}{P(\text{Loss})}\right) = s(E[S]) + s(s_h)\cdot h + s\left(E\left[\frac{S}{s_g+1}\right]\right), \quad (8)$$

where s is a smooth function. Optional variables, can be added to Equation 8. For example, variables h, u, $t_{off}$, and $t_{def}$ are added as linear parametric terms. Win probability for the play is provided as an inverse of the logit of Equation 8. The win probability model of Equation 8 is evaluated similarly to the calibration testing of the expected points model introduced in Equations 5-7.

Points after touchdown including extra point attempts and two-point attempts are evaluated separately in some embodiments. The two-point attempts are evaluated using historical success rate (e.g., a success rate of 47.35% reported by the NFL from play-by-play statistics from 2009-1016 results in EP=2×0.4835=0.9470). The generalized additive model (e.g., Equation 8) is used for predicting the probability of making the kick (P (M)) as a function of the kick's distance (k), as expressed by Equation 9:

$$\log\left(\frac{P(M)}{1-P(M)}\right) = s(k) \quad (9)$$

In some embodiments, Equation 9 is extended to include other variables in addition to the kick's distance, such as ball speed included in Table 4.

In some embodiments, field goal attempts are evaluated by combining Equation 9 with the cost of missing the field goal and turning the ball over to the opposing team, as expressed by Equation 10:

$$EP_{Field\ Goal\ attempt}=P(M)\cdot 3+(1-P(M))\cdot(-1)\cdot E[Y|X=m] \quad (10)$$

where E[Y|X=m] corresponds to the expected points from the model described above with Equation 3 adjusted with the assumption that the opposing team has taken the possession of the ball.

In various embodiments, the prediction determined by the process shown in FIG. 8 is transmitted for display at a client device. In other words, the process of FIG. 8 optionally includes transmitting the determined prediction for display. In some embodiments, the method also includes displaying a diagram of the first and second subset of players in the current play situation, and information related to the current play situation as shown in the next figure.

Figure 9:
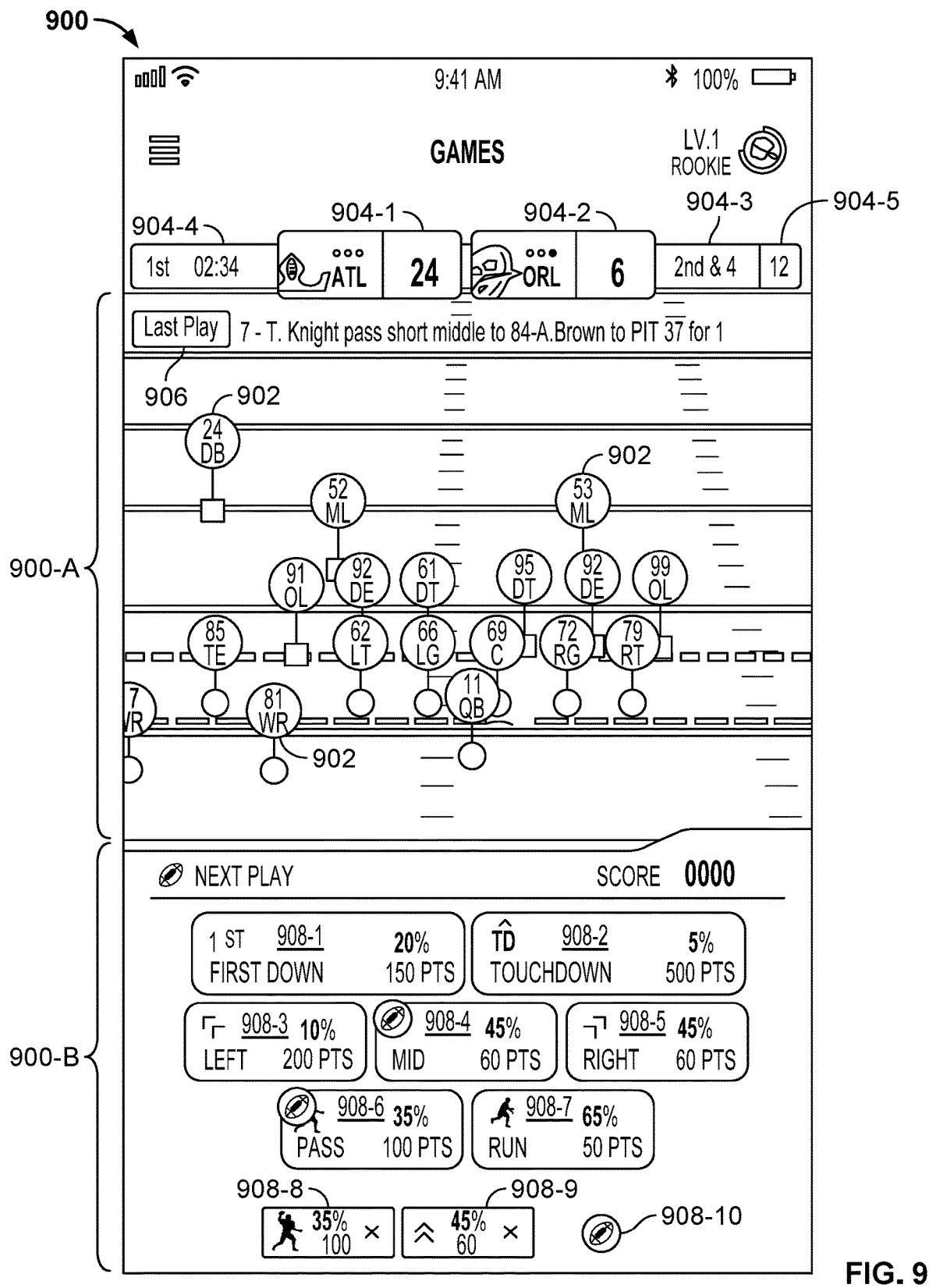
FIG. 9 shows an example display of a client device displaying a prediction of a future event occurring at a present competition according to an embodiment of the present disclosure.

FIG. 9 shows an example display of a client device displaying a prediction of a future event occurring at a present competition according to an embodiment of the present disclosure. The display can be part of a user device (e.g., a display of the user device 700 described above with respect to FIG. 7) displaying a view of an application having a user interface 900 (e.g., a user interface 900 corresponding to the user interface 778 described above with respect to FIG. 7). The display includes a section 900-A including a view of a video feed of live sport event and a plurality of affordances that display information related to the play situation of the live sport event and a section 900-B including affordances 908 illustrating predictions of the odds or probability of the first future event.

In the section 900-A, affordances 904-1 and 904-2 illustrate the present score of the game for each of the teams competing. An affordance 904-4 illustrates the present quarter and the number of minutes and seconds into the quarter. An affordance 904-3 illustrates the present down and a number of yards needed to obtain the down. An affordance 904-5 illustrates a play clock. For example, the play clock counts seconds from 40 to zero to illustrate the time left before a delay of play penalty is induced.

Each player of the first subset and the second subset of players is represented by an affordance 902 displayed in the section 900-A (e.g., the affordances 900 displayed on the live video feed of the game). In some embodiments, each affordance 900 is an avatar corresponding to a respective player. Positions of affordances 902 correspond to respective positions of the players in the field at the present time point for each of the competing teams. The position of each player is obtained from the tracking system described above with respect to FIGS. 1-5. An affordance 906 provides information related to a last play that has occurred in the live sport event. If the information does not fit the width of the screen in the row corresponding to affordance 906, the text can scroll across in a news ticker style.

The section 900-B includes a plurality of affordances providing a prediction of a next score event, as determined by the method 800. The section 900-B of the user interface 900 includes the affordances 908 displaying prediction of the probability of the first future event. The affordances 908 include affordances illustrating a prediction of whether the team in possession of the ball will attempt to advance the ball to the left in the next play (e.g., affordance 908-3), whether the team in possession of the ball will attempt to advance the ball down the middle in the next play (e.g., affordance 908-4), whether the team in possession of the ball will attempt to advance the ball to the right in the next play (e.g., affordance 908-3), whether the team in possession of the ball will attempt to pass the ball in the next play (908-6), whether the team in possession of the ball will attempt to run the ball in the next play (908-7), whether the team in possession of the ball will make a first down (e.g., affordance 908-1) or whether the team in possession of the ball will score a touchdown before losing possession of the ball to the opposing team (e.g., affordance 908-2).

The play situation is updated as the play situation in the game is changed. In some embodiments, the method 800 includes determining a second play situation of the live sport event using, at least in part, time-stamped position information of the first subset of players and the second subset of players in the present game through a second time point. The second time point is after the first time point. The time-stamped position information captured by the telemetry tracking system at the live sport through the second time point. The method 800 further includes determining, based on at least the playing data and the play situation through the second time point, a prediction of the probability of the second future event occurring at the live sport event. In some embodiments, the play situation is updated as the players move in the field (e.g., the affordances 902 corresponding to positions of respective players in the live game move into a different configuration). In some embodiments, the play situation is updated before each down. In response to an updated play situation, the prediction of the probability of the next score event is determined and the prediction is reflected to the affordances displayed in the section 900-B of the user interface 900.

In various embodiments, wagers can be accepted in association with predicting a future event in the present competition. The payout in the case where the user wager turns out to be the correct wager is determined based at least in part on the prediction of the probability of the first future event.

For example, a user can place a wager against the first future event predicted by process 800 using the application displayed in FIG. 9. In some embodiments, affordances from 908-8 to 908-10 are input elements configured to accept a wager from a user. In FIG. 9, affordance 908-8 illustrates that a user has provided a first wager on passing the ball and affordance 908-9 illustrates that the user has provided a second wager on advancing the ball down the middle. Affordance 908-10 is an input element corresponding to a third wager corresponding to the result of the next play. In FIG. 9, a user has not provided a third wager on the results of the play (e.g., 1st down or a touchdown), which is indicated by a football icon in affordance 908-10. The user may provide the third wager by selecting a 1st down or a touchdown by user input on affordance 908-10.

A wager is placed while the live sport event is occurring. For example, the user interface 900 is configured to accept a wager before each play during the live sport event. The payout in the case where the user wager turns out to be the correct wager is determined at least in part on a prediction of a probability of the first future event. The determining of the prediction of the probability of the first future event at the competition is performed by the method 800 described above with respect to FIG. 8.

The payout in the case where the user wager turns out to be the correct wager is determined at least in part on the prediction of the probability of the first future event. For example, the payout in the case that the user predicted correctly that the next play is passing the ball is determined based on the 35% probability of passing the ball (e.g., as shown in affordance 908-6). In some embodiments, the payout is determined by the odds management system 600 of the system 48, as described above with respect to FIG. 6.

While the present disclosure describes various systems and methods in relation to a gridiron football game, one skilled in the art will recognize that the present disclosure is not limited thereto. The techniques disclosed herein find application in games with a discrete or finite state where a player or team has possession of a ball (e.g., holding the ball) as well as other types of events. For instance, in some embodiments the systems and methods of the present disclosure are applied to events including a baseball game, a basketball game, a cricket game, a football game, a handball game, a hockey game (e.g., ice hockey, field hockey), a kickball game, a Lacrosse game, a rugby game, a soccer game, a softball game, or a volley, ball game, auto racing, boxing, cycling, running, swimming, tennis etc., or any such event in which a location of a subject is relevant to an outcome of the event. For example, for baseball the calculating and predicting is repeated after each inning, other than the final inning in the present game.

The present disclosure addresses the need in the art for improved systems and methods for evaluating team strengths and players' abilities. In particular, the present disclosure provides for predicting an outcome of a live sport event based on positional and kinetic data recorded by a player tracking system during the live sport event. The present disclosure facilitates increased spectators' engagement and interest in the live sport event by providing updated predictions of the outcome while the sport event is ongoing.

In some instances, a covariate corresponds to a single value (e.g., the current down is 1, 2, 3, or 4). In some instances, a covariate corresponds to a range of values. For example, a covariate describing the number of seconds remaining in the present half is defined either as a single value (e.g., 120 seconds) or as a range of values (e.g., 120-180 seconds). In some embodiments, the covariates include covariates listed in Table 5, which includes play-by-play data published by the NFL.

With regard to expected points evaluation, multinomial logistic regression, or other types of analysis, can be used for estimating the probabilities of each next event that is possible outcome of a given play situation. The next event is a scoring event or a non-scoring event. The scoring events include a touchdown of a team in possession of the ball (7 points), field goal of a team in possession of the ball (3 points), safety of a team in possession of the ball (2 points), opponent's safety (−2 points), opponent's field goal (−3 points), and opponent's touchdown (−7 points). Non-scoring events (0 points) include events that describe attempts the team in possession of the ball may take. In one instance, the team in possession of the ball may attempt to advance the ball to the left, to the right or down the middle in the next play. In another instance, the team in possession of the ball may attempt to pass the ball or run the ball in the next play.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A prediction system to predict a probability of a future event occurring in a live competition between a first competitor that includes a first set of one or more participants and a second competitor that includes a second set of one or more participants, the prediction system comprising:
a communication interface configured to receive telemetry data comprising positional data for the first set of one or more participants or the second set of one or more participants, wherein:
the positional data is combined to obtain time-stamped position information of one or more participants of one or both of the first set of one or more participants and the second set of one or more participants in the live competition; and
a processor coupled to the communication interface and configured to:
update a frequency with which position data for a particular participant is obtained based on a determination that a detected motion for the particular participant is greater than a predefined threshold;
use the time-stamped position information to determine a first play situation of the live competition;
store, in a database, statistical information pertaining to the live competition and historical statistical information, wherein the statistical information stored in the database is updated at the end of a predefined number of plays;
store, in a cache that provides rapid access during the live competition, the first play situation data and playing data associated with at least a subset of one or both of the first set of one or more participants and the second set of one or more participants, wherein the cache provides a more rapid access to information than the database, and the cache is allocated specifically for the live competition and is not used to cache data for another live competition; and
determine, based on at least the first play situation and playing data associated with at least a subset of one or both of the first set of one or more participants and the second set of one or more participants obtained from the local cache, a prediction of the probability of a first future event occurring at the live competition.

2. The prediction system of claim 1, wherein the positional data comprised in the telemetry is based at least in part on (i) an array of one or more anchor devices, and (ii) one or more tracking devices respectively associated with the first set of one or more participants or the second set of one or more participants.

3. The prediction system of claim 1, wherein determining the prediction of the probability of the first future event occurring at the live competition comprises:
identifying historical play configurations similar to the first play situation;
identifying information corresponding to the playing data and the first play situation; and
using play-by-play data associated with the historical play configurations indicating outcomes of next plays from given player configurations and information corresponding to the playing data and the first play situation to determine, in real-time during the live competition, the probability of the first future event occurring.

4. The prediction system of claim 3, wherein:
the information corresponding to the playing data and the first play situation includes formational information for a particular team of the live competition, the formation information being classified according to a classifier model determined according to a machine learning model; and
the playing data is updated in real-time during the live competition.

5. The prediction system of claim 1, further comprising an odds management system configured to determine and update predictive odds from future events in real time based at least in part on the prediction of the probability of the first future event occurring at the live competition.

6. The prediction system of claim 1, further comprising rejecting a user-submitted wager if a timestamp of the user-submitted wager is not synchronized with a timestamp of position information used to determine the prediction.

7. The prediction system of claim 1, further comprising a situation store configured to cache a situation to reduce processing time associated with using a formation classifier.

8. The prediction system of claim 1, wherein the processor is further configured to transmit the prediction to a display at a client device.

9. The prediction system of claim 1, wherein the live competition is a live football game and the first future event is at least one of: a scoring event and achieving a next down.

10. The prediction system of claim 1, wherein the playing data includes at least one of: a heart rate measured in real time, a height, an age, a weight, or a draft round pick.

11. The prediction system of claim 1, wherein the playing data includes at least one of: team strength, passing success, running success, or red zone offense/defense rating.

12. The prediction system of claim 1, wherein determining the first play situation includes using a set of parameters including at least one of: a current down, a number of seconds remaining in a current half, or yards from an end zone.

13. The prediction system of claim 1, wherein the processor is configured to determine a win probability model.

14. The prediction system of claim 1, wherein the first future event includes at least one of: goal, touchdown, score, first down, turnover, number of yards gained or lost, or pass completion.

15. The prediction system of claim 1, wherein determining the prediction of the probability of the first future event includes using historical playing data of one or more participants in one or both of the first set of one or more participants and the second set of one or more participants.

16. The prediction system of claim 1, wherein the first play situation includes at least one of the following covariates: a current period of play in the live competition, time remaining in at least a portion of the live competition, and distance from a marker in an environment of the live competition.

17. The prediction system of claim 1, wherein the playing data is updated in a database after a predetermined number of plays of the live competition.

18. The prediction system of claim 1, wherein:
the information corresponding to the playing data and the first play situation includes telemetry data obtained with respect to a plurality of groupings of participants selected from among the first set of participants and the second set of participants; and
the telemetry data obtained with respect to at least two of the plurality of groupings of participants is obtained at different ping rates.

19. The prediction system of claim 1, wherein a ping rate at which the telemetry data is collected is based at least in part on one or more of (i) a number of tracking devices used to collect the telemetry data, (ii) bandwidth limitations for the tracking devices, (iii) and an expected activity associated with the live competition.

20. A method to predict a probability of a future event occurring in a live competition between a first competitor that includes a first set of one or more participants and a second competitor that includes a second set of one or more participants, the method comprising:
receiving telemetry data comprising positional data for the first set of one or more participants or the second set of one or more participants, wherein:
the positional data is combined to obtain time-stamped position information of one or more participants of one or both of the first set of one or more participants and the second set of one or more participants in the live competition;
updating a frequency with which position data for a particular participant is obtained based on a determination that a detected motion for the particular participant is greater than a predefined threshold;
using the time-stamped position information to determine a first play situation of the live competition;
storing, in a database, statistical information pertaining to the live competition and historical statistical information, wherein the statistical information stored in the database is updated at the end of a predefined number of plays;
storing, in a cache that provides rapid access during the live competition, the first play situation data and playing data associated with at least a subset of one or both of the first set of one or more participants and the second set of one or more participants, wherein the cache provides a more rapid access to information than the database, and the cache is allocated specifically for the live competition and is not used to cache data for another live competition; and
determining, based on at least the first play situation and playing data associated with at least a subset of one or both of the first set of one or more participants and the second set of one or more participants obtained from the local cache, a prediction of the probability of a first future event occurring at the live competition.

21. A non-transitory computer readable storage medium containing a computer program and comprising computer instructions for predicting a probability of a future event occurring in a live competition between a first competitor that includes a first set of one or more participants and a second competitor that includes a second set of one or more participants:
receiving telemetry data comprising positional data for the first set of one or more participants or the second set of one or more participants, wherein:
the positional data is combined to obtain time-stamped position information of one or more participants of one or both of the first set of one or more participants and the second set of one or more participants in the live competition;
updating a frequency with which position data for a particular participant is obtained based on a determination that a detected motion for the particular participant is greater than a predefined threshold;
using the time-stamped position information to determine a first play situation of the live competition;
storing, in a database, statistical information pertaining to the live competition and historical statistical information, wherein the statistical information stored in the database is updated at the end of a predefined number of plays;
storing, in a cache that provides rapid access during the live competition, the first play situation data and playing data associated with at least a subset of one or both of the first set of one or more participants and the second set of one or more participants, wherein the cache provides a more rapid access to information than the database, and the cache is allocated specifically for the live competition and is not used to cache data for another live competition; and
determining, based on at least the first play situation and playing data associated with at least a subset of one or both of the first set of one or more participants and the second set of one or more participants obtained from the local cache, a prediction of a probability of a first future event occurring at the live competition.

* * * * *